US012676756B2

(12) United States Patent
Chan et al.

(10) Patent No.: US 12,676,756 B2
(45) Date of Patent: *Jul. 7, 2026

(54) UNIVERSALLY TRUSTED BRIDGES FOR HETEROGENOUS BLOCKCHAIN NETWORKS

(71) Applicant: PayPal, Inc., San Jose, CA (US)

(72) Inventors: Michael Jim Tien Chan, Cupertino, CA (US); Oluwatomisin Olayemi Jenrola, Nepean (CA); Vladimir Bacvanski, Portola Valley, CA (US); John Lucas Timoney, Bronxville, NY (US); Daniel Santiago Rincon Silva, San Jose, CA (US); Aklen Altanel, London (GB); Liam Julian DiGregorio, Manhattan Beach, CA (US); Suryatej Gundavelli, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 236 days.

This patent is subject to a terminal disclaimer.

(21) Appl. No.: 18/401,113

(22) Filed: Dec. 29, 2023

(65) Prior Publication Data

US 2024/0205019 A1 Jun. 20, 2024

Related U.S. Application Data

(63) Continuation of application No. 17/412,132, filed on Aug. 25, 2021, now Pat. No. 11,888,991.

(51) Int. Cl.
*H04L 9/32* (2006.01)
*G06Q 20/06* (2012.01)
(Continued)

(52) U.S. Cl.
CPC ......... *H04L 9/3247* (2013.01); *G06Q 20/065* (2013.01); *G06Q 20/405* (2013.01);
(Continued)

(58) Field of Classification Search
CPC ... H04L 2209/56; G06F 21/64; G06Q 20/223; G06Q 20/3678; G06Q 20/3827; G06Q 20/3829
See application file for complete search history.

(56) References Cited

U.S. PATENT DOCUMENTS

| | | | |
|---|---|---|---|
| 11,888,991 B2 * | 1/2024 | Chan | G06Q 20/401 |
| 2019/0238316 A1 | 8/2019 | Padmanabhan | |

(Continued)

*Primary Examiner* — Beemnet W Dada
(74) *Attorney, Agent, or Firm* — Haynes and Boone, LLP

(57) ABSTRACT

Different communication and software protocols may be used by different blockchain networks. Cross-chain communication is provided via a software bridge configured to enable specific operations. An event request may be sent from a first blockchain network to a second blockchain network. The event request may be processed using a first protocol of the first network to provide a first output. An offer of equivalent processing provided by the second network may be verified by: processing the event request using a second protocol of the second network to provide a second output, and confirming that the second output matches the offer of equivalent processing. A processing equivalence of the event request may be established between the first network and the second network based on the first output of the event request processed using the first protocol and the second output of the event request processed using the second protocol.

20 Claims, 16 Drawing Sheets

(51) Int. Cl.
  *G06Q 20/40*   (2012.01)
  *H04L 9/00*    (2022.01)

(52) U.S. Cl.
  CPC .............. *H04L 9/3239* (2013.01); *H04L 9/50*
      (2022.05); *H04L 2209/56* (2013.01)

(56)     References Cited

U.S. PATENT DOCUMENTS

| | | | |
|---|---|---|---|
| 2019/0245697 A1* | 8/2019 | El Abed | ................ H04L 9/0618 |
| 2020/0065763 A1 | 2/2020 | Rosinzonsky et al. | |
| 2020/0364212 A1* | 11/2020 | Cho | ........................ H04L 12/46 |
| 2020/0402025 A1 | 12/2020 | Wang et al. | |
| 2021/0157875 A1 | 5/2021 | Lu | |
| 2021/0160252 A1* | 5/2021 | Qiu | ....................... H04L 67/565 |
| 2021/0272075 A1 | 9/2021 | Adams et al. | |
| 2022/0147999 A1 | 5/2022 | Luo et al. | |

* cited by examiner

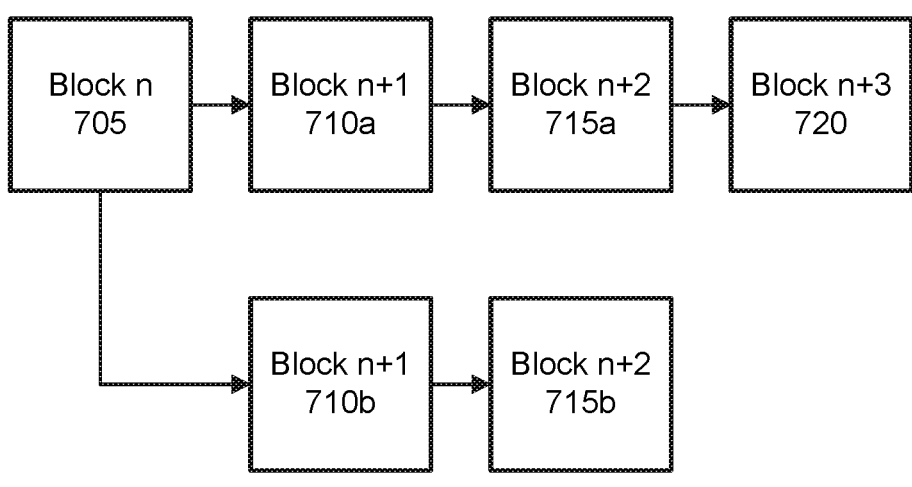
FIG. 7A
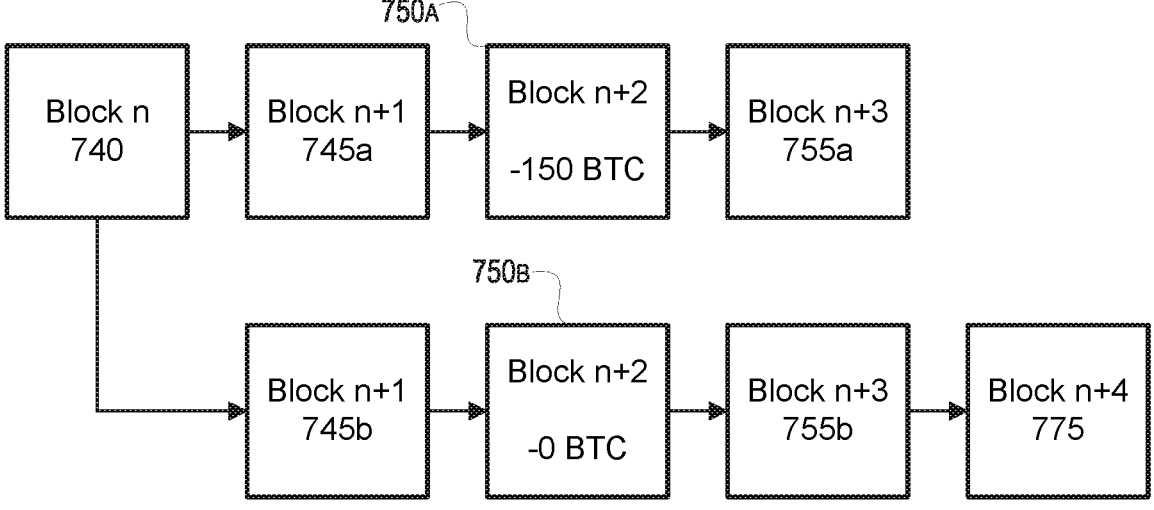
FIG. 7B

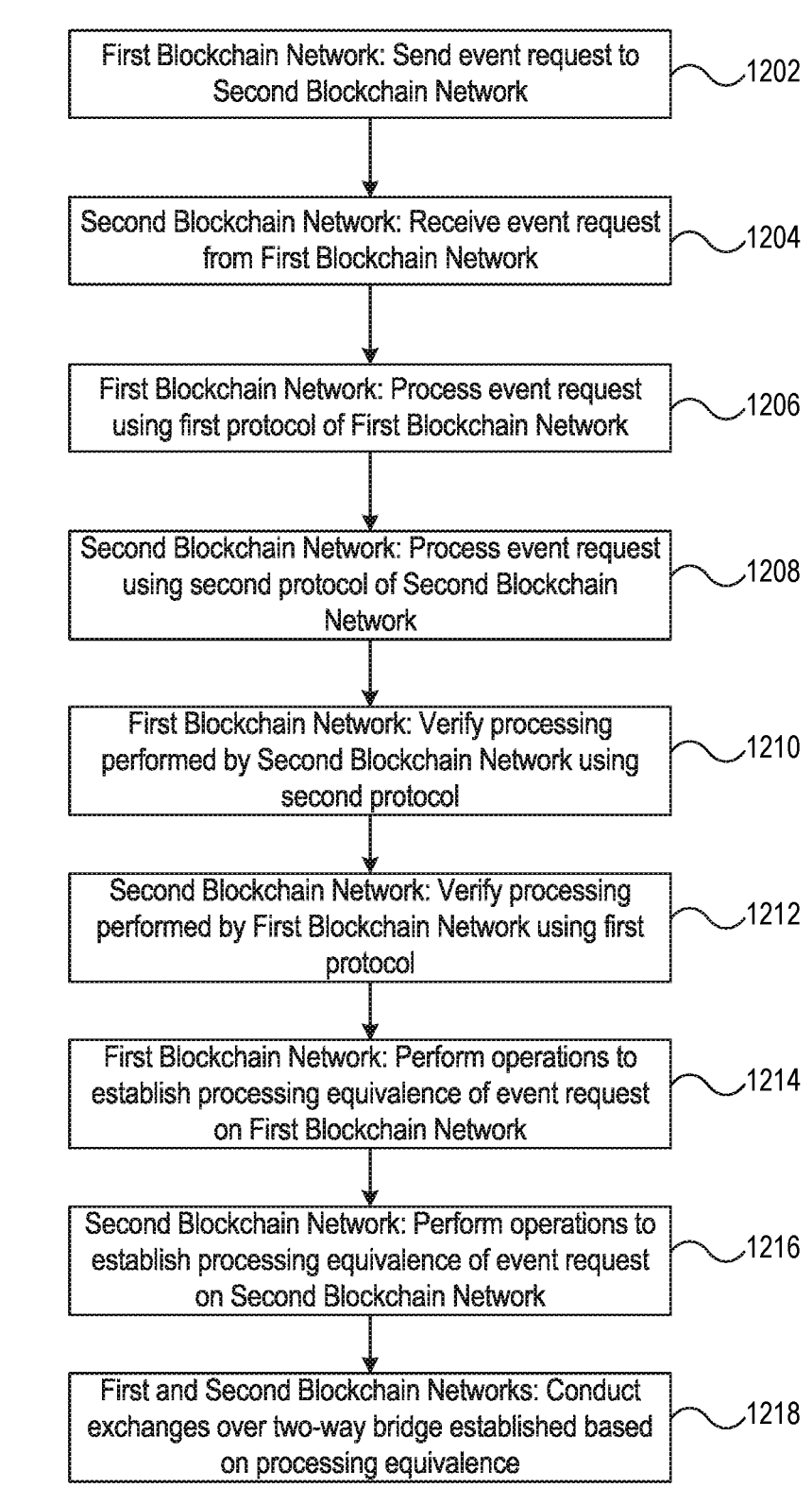

1200

First Blockchain Network: Send event request to Second Blockchain Network ~1202

Second Blockchain Network: Receive event request from First Blockchain Network ~1204

First Blockchain Network: Process event request using first protocol of First Blockchain Network ~1206

Second Blockchain Network: Process event request using second protocol of Second Blockchain Network ~1208

First Blockchain Network: Verify processing performed by Second Blockchain Network using second protocol ~1210

Second Blockchain Network: Verify processing performed by First Blockchain Network using first protocol ~1212

First Blockchain Network: Perform operations to establish processing equivalence of event request on First Blockchain Network ~1214

Second Blockchain Network: Perform operations to establish processing equivalence of event request on Second Blockchain Network ~1216

First and Second Blockchain Networks: Conduct exchanges over two-way bridge established based on processing equivalence ~1218

FIG. 12

UNIVERSALLY TRUSTED BRIDGES FOR HETEROGENOUS BLOCKCHAIN NETWORKS

CROSS REFERENCE TO RELATED APPLICATION

The present invention is a Continuation of U.S. patent application Ser. No. 17/412,132, filed Aug. 25, 2021, the disclosure of which is incorporated herein by reference in its entirety.

TECHNICAL FIELD

The present disclosure generally relates to blockchain technology, and hardware and software related thereto. More specifically, the present disclosure relates to systems and methods for implementing blockchain bridges that allow exchanges between different types of blockchains in a variety of blockchain network environments, according to various embodiments.

BACKGROUND

Blockchains may have different formats that present interoperability problems. One type of blockchain may use different types of operations (e.g. encryption, transaction commitment, etc.) than another type of blockchain. This means that various blockchains cannot readily exchange information with each other, and thus, enabling a cross-chain transaction presents various difficulties.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings:

FIG. 7A shows an example of a privately broadcasted blockchain.

FIG. 7B shows an example of blockchain misuse.

FIG. 12 is a flow diagram showing steps of an example method for generating a blockchain bridge for heterogeneous blockchain networks for use in data exchange between the heterogenous blockchain networks.

DETAILED DESCRIPTION

Figure 1:
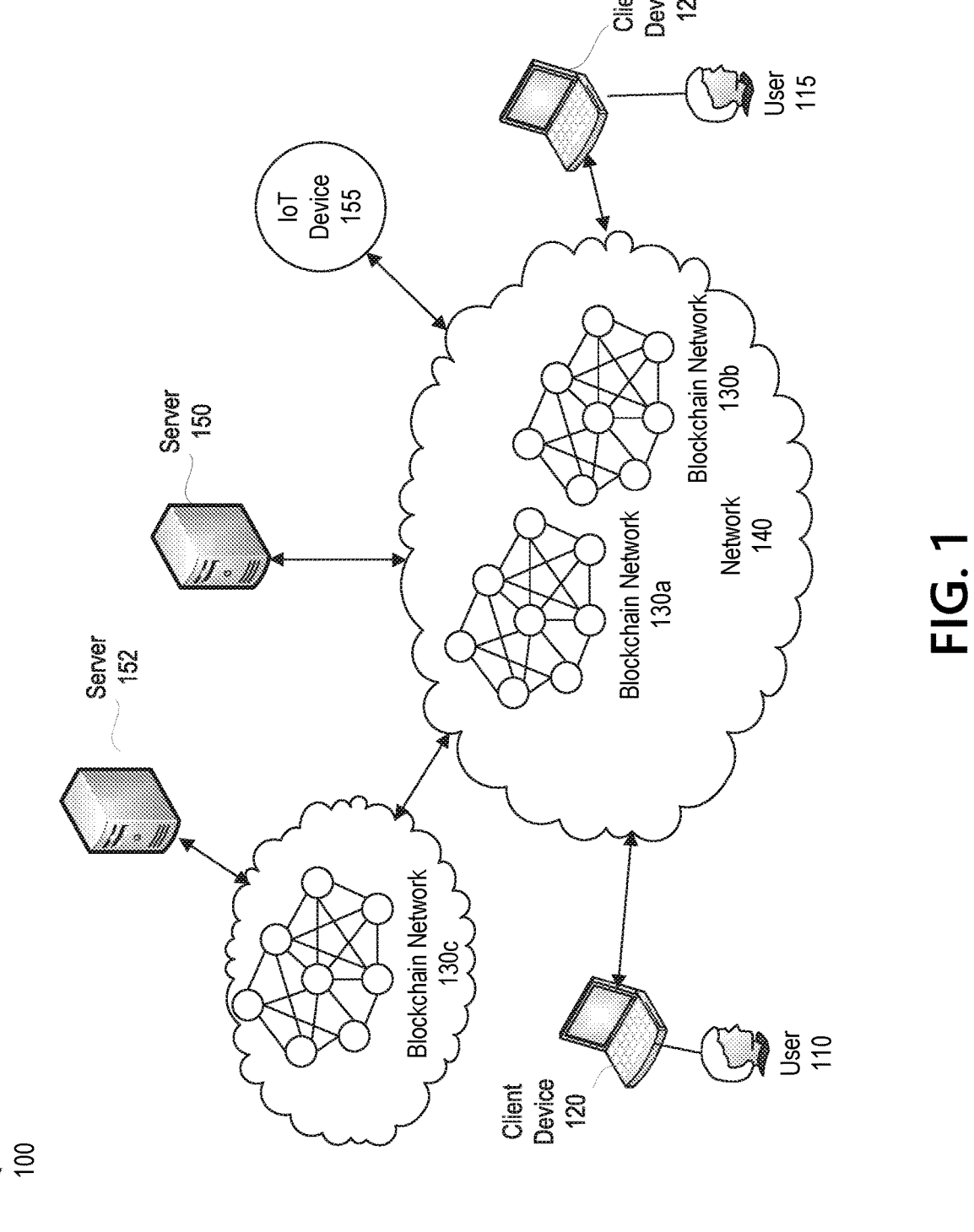
FIG. 1 illustrates an example computing architecture for facilitating one or more blockchain based transactions.

In the following description of the various embodiments, reference is made to the accompanying drawings identified above and which form a part hereof, and in which is shown by way of illustration of various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

Blockchain bridges enable interoperability between different blockchain networks, such as Bitcoin, Ethereum, etc., and between parent blockchains and child blockchains (e.g., sidechains), which may operate under different protocols, consensus rules, cryptographic suites, etc. Interoperability between blockchain networks may include the transfer/exchange of tokens, data, and smart contract instructions between the blockchain networks. For example, blockchain bridges may allow users to deploy digital assets hosted on one blockchain network to decentralized applications (dApps) on another blockchain network, conduct fast, low-cost transactions of tokens hosted on otherwise less scalable blockchains, execute dApps across more than one blockchain network, and so forth.

However, to perform a cross-chain transaction, two or more blockchain networks involved in the transaction need to reach an agreement with regard to how the transaction will be processed on their respective blockchain networks. While third-party bridge solutions and single-side bridge solutions exist, these solutions are black/gray box as their internal mechanisms are proprietary for their developer, and often cause at least one side of a cross-chain transaction to have questions or concerns regarding the trustworthiness of the particular bridge. Currently, there is no trusted bridge for two or more blockchain networks with disparate network protocols or for when two states with regulatory oversight on the blockchain networks cannot trust each other. Thus, there is a need in the art for blockchain bridges that are co-built as a membrane of trust where participating networks may build and co-sign an offer-and-agreed upon premise for mapping respective network protocols to a single equivalent that can be used as a platform to conduct cross-chain transactions that may be represented on each of the participating networks.

In its broadest sense, blockchain refers to a framework that supports a trusted ledger that is stored, maintained, and updated in a distributed manner in a peer-to-peer network. For example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX.IO, Shapeshift, Poloniex, Bitstamp, Coinmama, Bisq, LocalBitcoins, Gemini and others, the distributed ledger represents each transaction where units of the cryptocurrency are transferred between entities. For example, using a digital currency exchange, a user may buy any value of digital currency or exchange any holdings in digital currencies into worldwide currency or other digital currencies. Each transaction can be verified by the distributed ledger and only verified transactions are added to the ledger. The ledger, along with many aspects of blockchain, may be referred to as "decentralized" in that a central authority is typically not present. Because of this, the accuracy and integrity of the ledger cannot be attacked at a single, central location. Modifying the ledger at all, or a majority of, locations where it is stored is made difficult so as to protect the integrity of the ledger. This is due in large part because individuals associated with the nodes that make up the peer-to-peer network have a vested interest in the accuracy of the ledger.

Though maintaining cryptocurrency transactions in the distributed ledger may be the most recognizable use of blockchain technology today, the ledger may be used in a variety of different fields. Indeed, blockchain technology is applicable to any application where data of any type may be accessed where the accuracy of the data is assured. For example, a supply chain may be maintained in a blockchain ledger, where the transfer of each component from party to party, and location to location, may be recorded in the ledger for later retrieval. Doing so allows for easier identification of a source for a defective part and where other such defective parts have been delivered. Similarly, food items may be tracked in like manner from farm to grocery store to purchaser.

Implementations of the present disclosure will now be described in detail with reference to the accompanying Figures.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Computing Architecture

As discussed above, the distributed ledger in a blockchain framework is stored, maintained, and updated in a peer-to-peer network. In one example the distributed ledger maintains a number of blockchain transactions. FIG. 1 shows an example system 100 for facilitating a blockchain transaction. The system 100 includes a first client device 120, a second client device 125, a first server 150, and an Internet of Things (IOT) device 155 interconnected via a network 140. The first client device 120, the second client device 125, the first server 150 may be a computing device 605 described in more detail with reference to FIG. 6. The IoT device 155 may comprise any of a variety of devices including vehicles, home appliances, embedded electronics, software, sensors, actuators, thermostats, light bulbs, door locks, refrigerators, RFID implants, RFID tags, pacemakers, wearable devices, smart home devices, cameras, trackers, pumps, POS devices, and stationary and mobile communication devices along with connectivity hardware configured to connect and exchange data. The network 140 may be any of a variety of available networks, such as the Internet, and represents a worldwide collection of networks and gateways to support communications between devices connected to the network 140. The system 100 may also comprise one or more distributed or peer-to-peer (P2P) networks, such as a first, second, and third blockchain network 130a-c (generally referred to as blockchain networks 130). As shown in FIG. 1, the network 140 may comprise the first and second blockchain networks 130a and 130b. The third blockchain network 130c may be associated with a private blockchain as described below with reference to FIG. 2, and is thus, shown separately from the first and second blockchain networks 130a and 103b. Each blockchain network 130 may comprise a plurality of interconnected devices (or nodes) as described in more detail with reference to FIG. 2. As discussed above, a ledger, or blockchain, is a distributed database for maintaining a growing list of records comprising any type of information. A blockchain, as described in more detail with reference to FIG. 3, may be stored at least at multiple nodes (or devices) of the one or more blockchain networks 130.

In one example, a blockchain based transaction may generally involve a transfer of data or value between entities, such as the first user 110 of the first client device 120 and the second user 115 of the second client device 125 in FIG. 1. The server 150 may include one or more applications, for example, a transaction application configured to facilitate the transaction between the entities by utilizing a blockchain associated with one of the blockchain networks 130. As an example, the first user 110 may request or initiate a transaction with the second user 115 via a user application executing on the first client device 120. The transaction may be related to a transfer of value or data from the first user 110 to the second user 115. The first client device 120 may send a request of the transaction to the server 150. The server 150 may send the requested transaction to one of the blockchain networks 130 to be validated and approved as discussed below.

Blockchain Network

Figure 2:
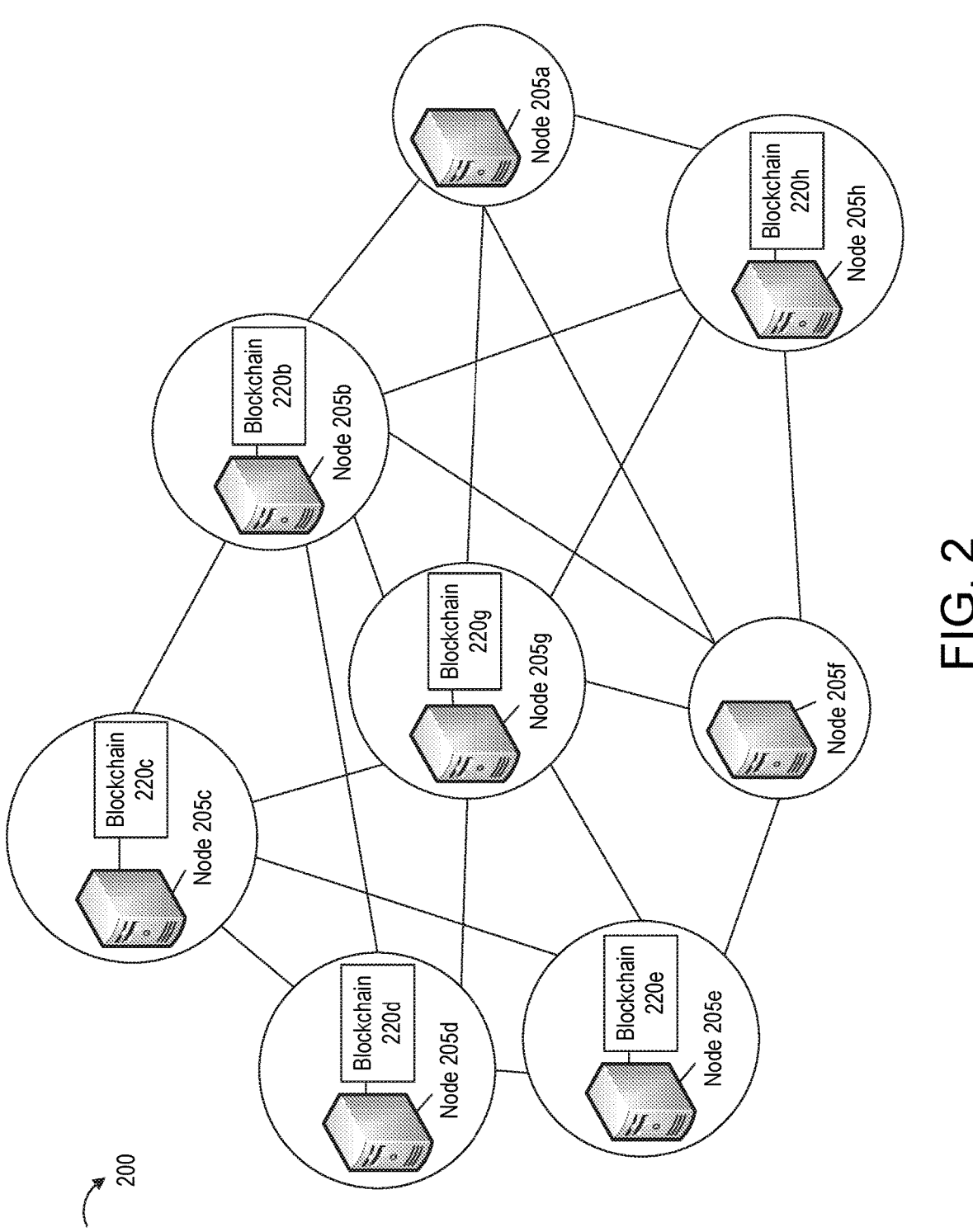
FIG. 2 illustrates an example blockchain network.
Figure 3:
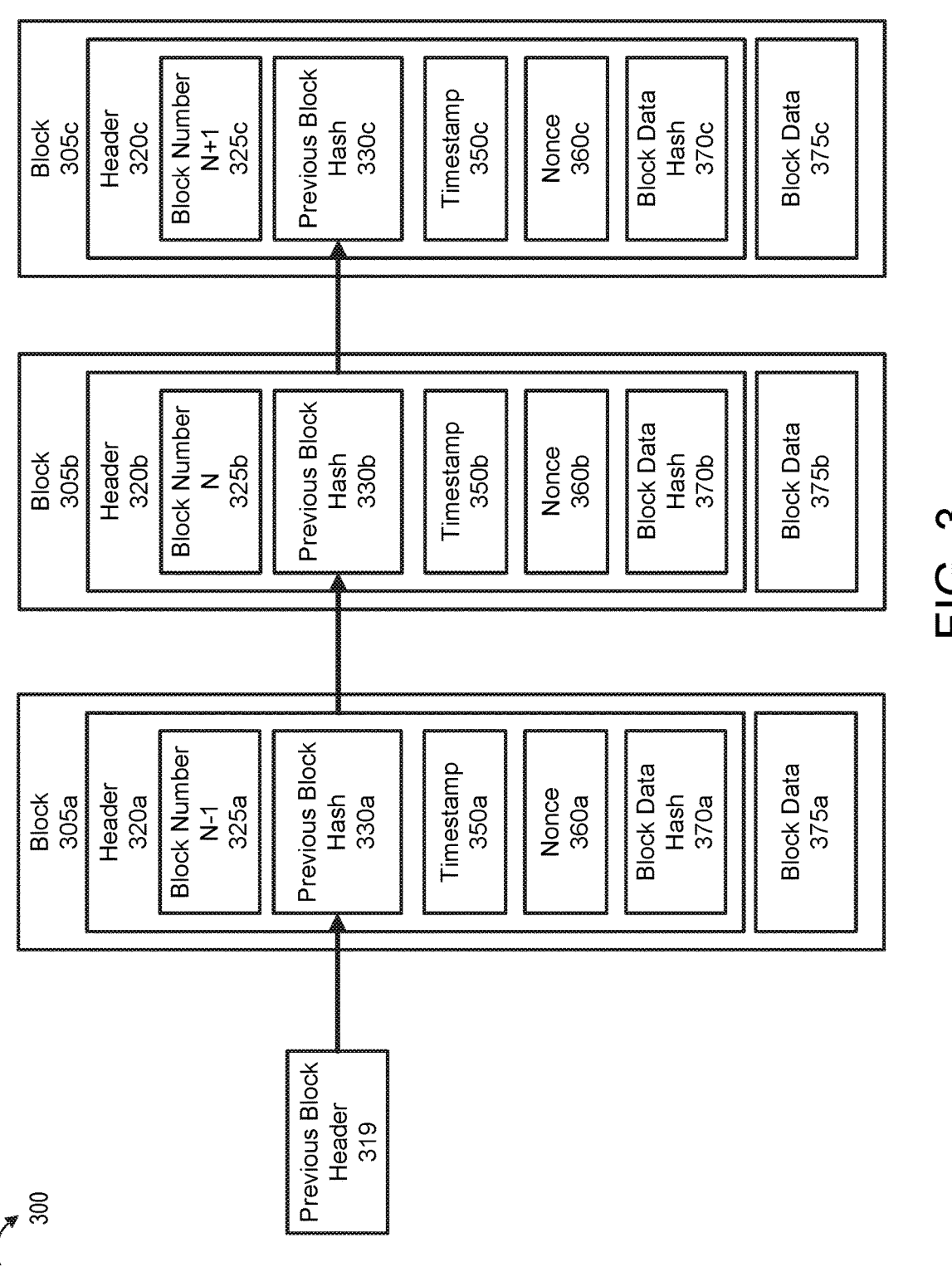
FIG. 3 illustrates an example blockchain.

FIG. 2 shows an example blockchain network 200 comprising a plurality of interconnected nodes or devices 205a-h (generally referred to as nodes 205). Each of the nodes 205 may comprise a computing device 605 described in more detail with reference to FIG. 6. Although FIG. 2 shows a single device 205, each of the nodes 205 may comprise a plurality of devices (e.g., a pool). The blockchain network 200 may be associated with a blockchain 220. Some or all of the nodes 205 may replicate and save an identical copy of the blockchain 220. For example, FIG. 3 shows that the nodes 205b-e and 205g-h store copies of the blockchain 220. The nodes 205b-e and 205g-h may independently update their respective copies of the blockchain 220 as discussed below.

Blockchain Node Types

Blockchain nodes, for example, the nodes 205, may be full nodes or lightweight nodes. Full nodes, such as the nodes 205b-e and 205g-h, may act as a server in the blockchain network 200 by storing a copy of the entire blockchain 220 and ensuring that transactions posted to the blockchain 220 are valid. The full nodes 205b-e and 205g-h may publish new blocks on the blockchain 220. Lightweight nodes, such as the nodes 205a and 205f, may have fewer computing resources than full nodes. For example, IoT devices often act as lightweight nodes. The lightweight nodes may communicate with other nodes 205, provide the full nodes 205b-e and 205g-h with information, and query the status of a block of the blockchain 220 stored by the full nodes 205b-e and 205g-h. In this example, however, as shown in FIG. 2, the lightweight nodes 205a and 205f may not store a copy of the blockchain 220 and thus, may not publish new blocks on the blockchain 220.

Blockchain Network Types

The blockchain network 200 and its associated blockchain 220 may be public (permissionless), federated or consortium, or private. If the blockchain network 200 is public, then any entity may read and write to the associated blockchain 220. However, the blockchain network 200 and its associated blockchain 220 may be federated or consortium if controlled by a single entity or organization. Further, any of the nodes 205 with access to the Internet may be restricted from participating in the verification of transactions on the blockchain 220. The blockchain network 200 and its associated blockchain 220 may be private (permissioned) if access to the blockchain network 200 and the blockchain 220 is restricted to specific authorized entities, for example organizations or groups of individuals. Moreover, read permissions for the blockchain 220 may be public or restricted while write permissions may be restricted to a controlling or authorized entity.

Blockchain

As discussed above, a blockchain 220 may be associated with a blockchain network 200. FIG. 3 shows an example blockchain 300. The blockchain 300 may comprise a plurality of blocks 305a, 305b, and 305c (generally referred to as blocks 305). The blockchain 300 comprises a first block (not shown), sometimes referred to as the genesis block. Each of the blocks 305 may comprise a record of one or a plurality of submitted and validated transactions. The blocks 305 of the blockchain 300 may be linked together and cryptographically secured. In some cases, the post-quantum cryptographic algorithms that dynamically vary over time may be utilized to mitigate ability of quantum computing to break present cryptographic schemes. Examples of the various types of data fields stored in a blockchain block are provided below. A copy of the blockchain 300 may be stored locally, in the cloud, on grid, for example by the nodes 205b-e and 205g-h, as a file or in a database.

Blocks

Each of the blocks 305 may comprise one or more data fields. The organization of the blocks 305 within the blockchain 300 and the corresponding data fields may be implementation specific. As an example, the blocks 305 may comprise a respective header 320a, 320b, and 320c (generally referred to as headers 320) and block data 375a, 375b, and 375c (generally referred to as block data 375). The headers 320 may comprise metadata associated with their respective blocks 305. For example, the headers 320 may comprise a respective block number 325a, 325b, and 325c. As shown in FIG. 3, the block number 325a of the block 305a is N−1, the block number 325b of the block 305b is N, and the block number 325c of the block 305c is N+1. The headers 320 of the blocks 305 may include a data field comprising a block size (not shown).

The blocks 305 may be linked together and cryptographically secured. For example, the header 320b of the block N (block 305b) includes a data field (previous block hash 330b) comprising a hash representation of the previous block N−1's header 320a. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 320c of the block N+1 (block 305c) includes a data field (previous block hash 330c) comprising a hash representation of block N's (block 305b) header 320b.

The headers 320 of the blocks 305 may also include data fields comprising a hash representation of the block data, such as the block data hash 370a-c. The block data hash 370a-c may be generated, for example, by a Merkle tree and by storing the hash or by using a hash that is based on all of the block data. The headers 320 of the blocks 305 may comprise a respective nonce 360a, 360b, and 360c. In some implementations, the value of the nonce 360a-c is an arbitrary string that is concatenated with (or appended to) the hash of the block. The headers 320 may comprise other data, such as a difficulty target.

The blocks 305 may comprise a respective block data 375a, 375b, and 375c (generally referred to as block data 375). The block data 375 may comprise a record of validated transactions that have also been integrated into the blockchain 200 via a consensus model (described below). As discussed above, the block data 375 may include a variety of different types of data in addition to validated transactions. Block data 375 may include any data, such as text, audio, video, image, or file, that may be represented digitally and stored electronically.

Blockchain Transaction

In one example, a blockchain based transaction may generally involve a transfer of data or value or an interaction between entities and described in more detail below. Referring back to FIG. 1, the server 150 may include one or more applications, for example, a transaction application configured to facilitate a blockchain transaction between entities. The entities may include users, devices, etc. The first user 110 may request or initiate a transaction with the second user 115 via a user application executing on the first client device 120. The transaction may be related to a transfer of value or data from the first user 110 to the second user 115. The value or data may represent money, a contract, property, records, rights, status, supply, demand, alarm, trigger, or any other asset that may be represented in digital form. The transaction may represent an interaction between the first user 110 and the second user 115.

Figure 4:
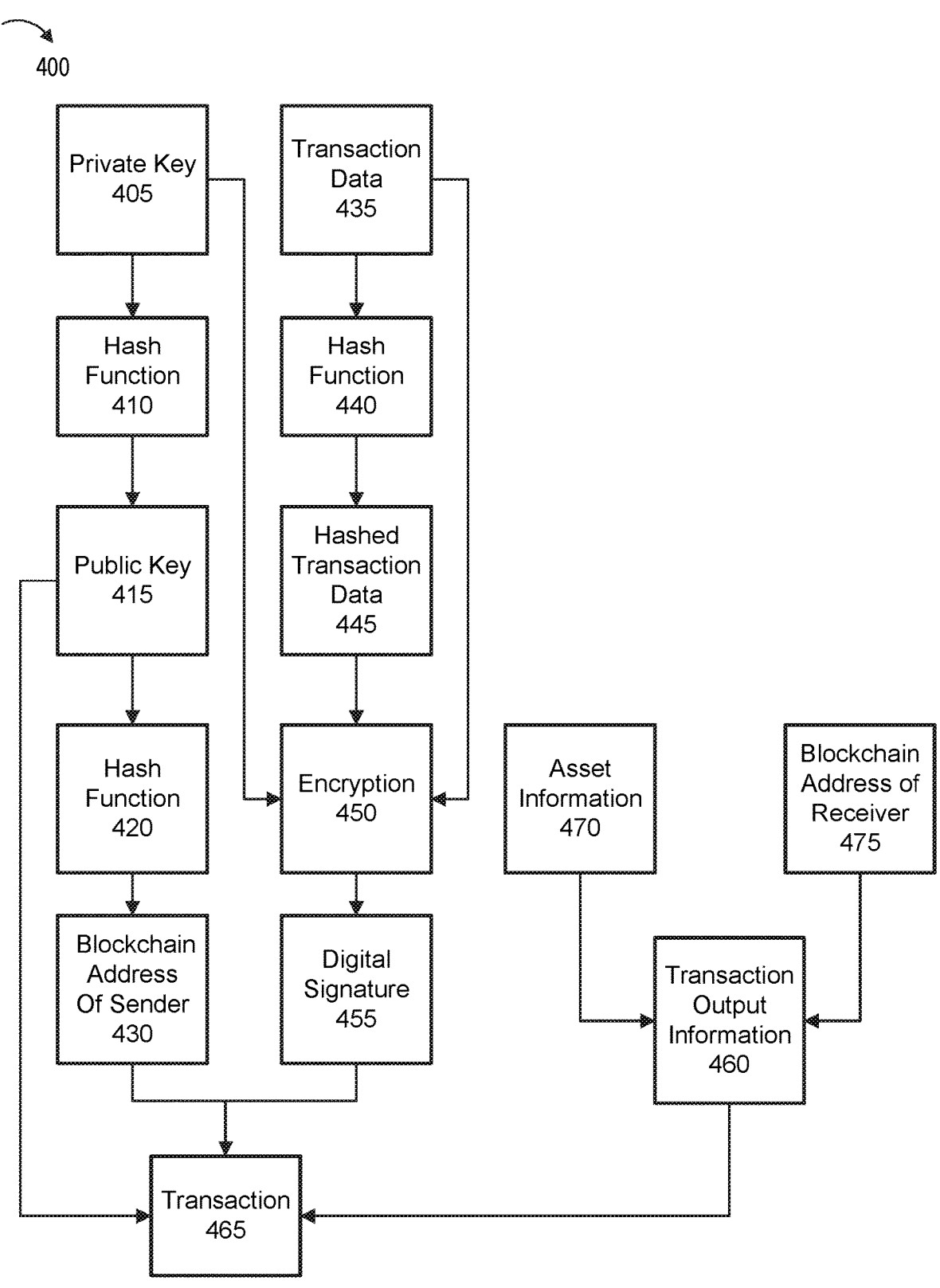
FIG. 4 is a diagram of an example transaction message.

FIG. 4 is a diagram of a flow 400 that generates a transaction 465 by the transaction application. The transaction 465 may include a public key 415, a blockchain address 430 associated with the first user 110, a digital signature 455, and transaction output information 460. The transaction application may derive a public key 415 from a private key 405 of the first user 110 by applying a cryptographic hash function 410 to the private key 405. The cryptographic hash function 410 may be based on AES, SHA-2, SHA-3, RSA, ECDSA, ECDH (elliptic curve cryptography), or DSA (finite field cryptography), although other cryptographic models may be utilized. More information about cryptographic algorithms may be found in Federal Information Processing Standards Publication (FIPS PUB 180-3), Secure Hash Standard. The transaction application may derive an address or identifier for the first user 110, such as the blockchain address 430, by applying a hash function 420 to the public key 415. Briefly, a hash function is a function that may be used for mapping arbitrary size data to fixed size data. The value may also be referred to as a digest, a hash value, a hash code, or a hash. In order to indicate that the first user 110 is the originator of the transaction 465, the transaction application may generate the digital signature 455 for the transaction data 435 using the private key 405 of the first user 110. The transaction data 435 may include information about the assets to be transferred and a reference to the sources of the assets, such as previous transactions in which the assets were transferred to the first user 110 or an identification of events that originated the assets. Generating the digital signature 455 may include applying a hash function 440 to the transaction data 435 resulting in hashed transaction data 445. The hashed transaction data 445 and the transaction data 435 may be encrypted (via an encryption function 450) using the private key 405 of the first user 110 resulting in the digital signature 455. The transaction output information 460 may include asset information 450 and an address or identifier for the second user 450, such as the blockchain address 450. The transaction 465 may be sent from the first client device 125 to the server 150.

The specific type of cryptographic algorithm being utilized may vary dynamically based on various factors, such as a length of time, privacy concerns, etc. For example, the type of cryptographic algorithm being utilized may be changed yearly, weekly, daily, etc. The type of algorithms may also change based on varying levels of privacy. For example, an owner of content may implement a higher level of protection or privacy by utilizing a stronger algorithm.

Blockchain Addresses

A blockchain network may utilize blockchain addresses to indicate an entity using the blockchain or start and end points in the transaction. For example, a blockchain address for the first user 110, shown in FIG. 4 as the blockchain address of sender 430, may include an alphanumeric string of characters derived from the public key 415 of the first user 110 based on applying a cryptographic hash function 420 to the public key 415. The methods used for deriving the addresses may vary and may be specific to the implementation of the blockchain network. In some examples, a blockchain address may be converted into a QR code representation, barcode, token, or other visual representations or graphical depictions to enable the address to be optically scanned by a mobile device, wearables, sensors, cameras, etc. In addition to an address or QR code, there are many ways of identifying individuals, objects, etc. represented in a blockchain. For example, an individual may be identified through biometric information such as a fingerprint, retinal scan, voice, facial id, temperature, heart rate, gestures/movements unique to a person etc., and through other types of identification information such as account numbers, home address, social security number, formal name, etc.

Broadcasting Transaction

Figure 5:
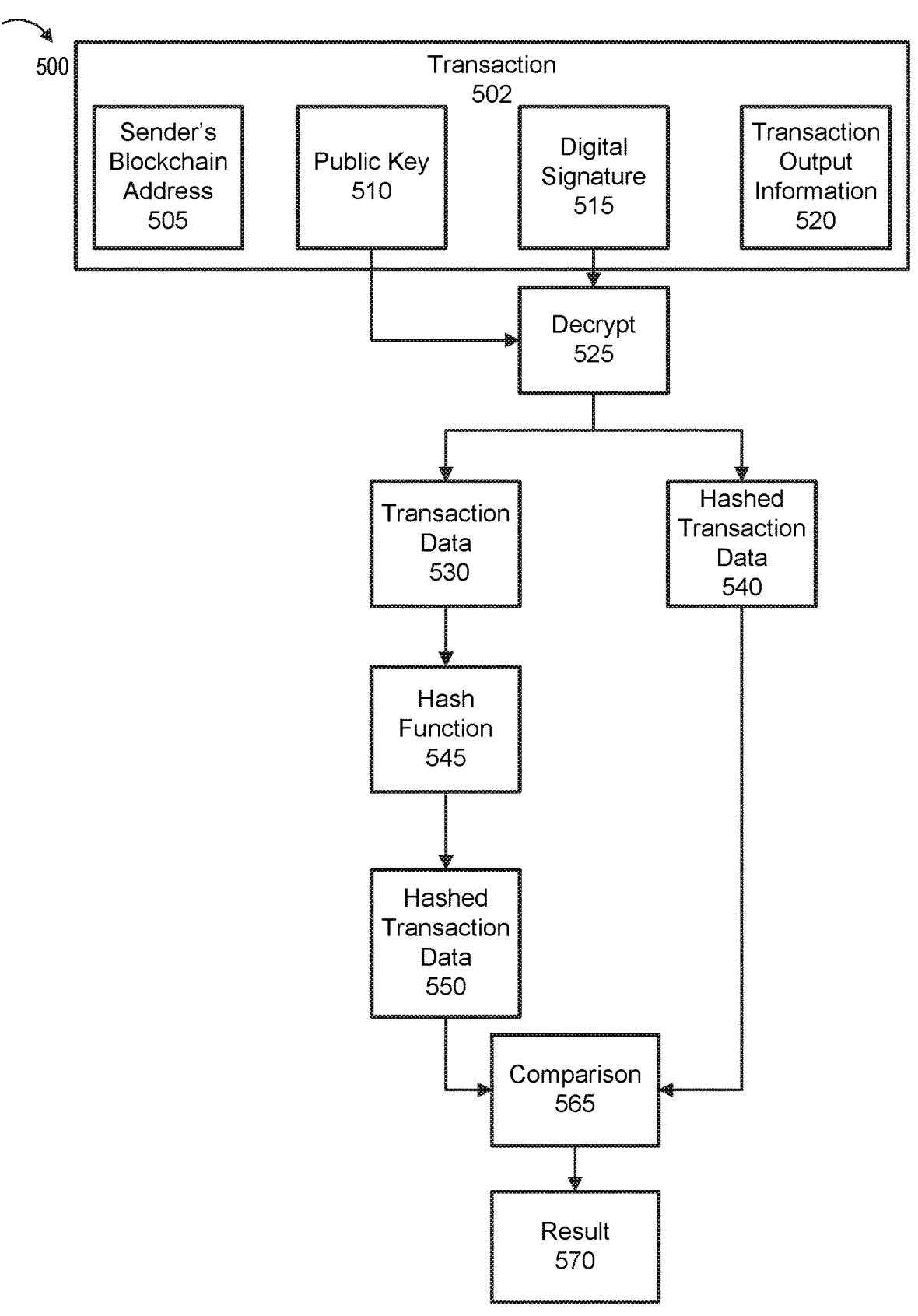
FIG. 5 shows an example transaction broadcast the blockchain network.

The server 150 may receive transactions from users of the blockchain network 130. The transactions may be submitted to the server 150 via desktop applications, smartphone applications, digital wallet applications, web services, or other software applications. The server 150 may send or broadcast the transactions to the blockchain network 130. FIG. 5 shows an example transaction 502 broadcast by the server 150 to the blockchain network 130. The transaction 502 may be broadcast to multiple nodes 205 of the blockchain network 130. Typically, once the transaction 502 is broadcast or submitted to the blockchain network 130, it may be received by one or more of the nodes 205. Once the transaction 502 is received by the one or more nodes 205 of the blockchain network 130, it may be propagated by the receiving nodes 205 to other nodes 205 of the blockchain network 130.

A blockchain network may operate according to a set of rules. The rules may specify conditions under which a node may accept a transaction, a type of transaction that a node may accept, a type of compensation that a node receives for accepting and processing a transaction, etc. For example, a node may accept a transaction based on a transaction history, reputation, computational resources, relationships with service providers, etc. The rules may specify conditions for broadcasting a transaction to a node. For example, a transaction may be broadcast to one or more specific nodes based on criteria related to the node's geography, history, reputation, market conditions, docket/delay, technology platform. The rules may be dynamically modified or updated (e.g. turned on or off) to address issues such as latency, scalability and security conditions. A transaction may be broadcast to a subset of nodes as a form of compensation to entities associated with those nodes (e.g., through receipt of compensation for adding a block of one or more transactions to a blockchain).

Transaction Validation—User Authentication and Transaction Data Integrity

Not all the full nodes 205 may receive the broadcasted transaction 502 at the same time, due to issues such as latency. Additionally, not all of the full nodes 205 that receive the broadcasted transaction 502 may choose to validate the transaction 502. A node 205 may choose to validate specific transactions, for example, based on transaction fees associated with the transaction 502. The transaction 502 may include a blockchain address 505 for the sender, a public key 510, a digital signature 515, and transaction output information 520. The node 205 may verify whether the transaction 502 is legal or conforms to a pre-defined set of rules. The node 205 may also validate the transaction 502 based on establishing user authenticity and transaction data integrity. User authenticity may be established by determining whether the sender indicated by the transaction 502 is in fact the actual originator of the transaction 502. User authenticity may be proven via cryptography, for example, asymmetric-key cryptography using a pair of keys, such as a public key and a private key. Additional factors may be considered when establishing user authenticity, such as user reputation, market conditions, history, transaction speed, etc. Data integrity of the transaction 502 may be established by determining whether the data associated with the transaction 502 was modified in any way. Referring back to FIG. 4, when the transaction application creates the transaction 465, it may indicate that the first user 110 is the originator of the transaction 465 by including the digital signature 455.

The node 205 may decrypt the digital signature 515 using the public key 510. A result of the decryption may include hashed transaction data 540 and transaction data 530. The node 205 may generate hashed transaction data 550 based on applying a hash function 545 to the transaction data 530. The node 205 may perform a comparison 565 between the first hashed transaction data 540 and the second hashed transaction data 550. If the result 570 of the comparison 565 indicates a match, then the data integrity of the transaction 502 may be established and node 205 may indicate that the transaction 502 has been successfully validated. Otherwise, the data of the transaction 502 may have been modified in some manner and the node 205 may indicate that the transaction 502 has not been successfully validated.

Each full node 205 may build its own block and add validated transactions to that block. Thus, the blocks of different full nodes 205 may comprise different validated transactions. As an example, a full node 205*a* may create a first block comprising transactions "A," "B," and "C." Another full node 205*b* may create a second block comprising transactions "C," "D," and "E." Both blocks may include valid transactions. However, only one block may get added to the blockchain, otherwise the transactions that the blocks may have in common, such as transaction "C" may be recorded twice leading to issues such as double-spending when a transaction is executed twice. One problem that may be seen with the above example is that transactions "C," "D," and "E" may be overly delayed in being added to the blockchain. This may be addressed a number of different ways as discussed below.

Securing Keys

Private keys, public keys, and addresses may be managed and secured using software, such as a digital wallet. Private keys may also be stored and secured using hardware. The digital wallet may also enable the user to conduct transactions and manage the balance. The digital wallet may be stored or maintained online or offline, and in software or hardware or both hardware and software. Without the public/private keys, a user has no way to prove ownership of assets. Additionally, anyone with access a user's public/private keys may access the user's assets. While the assets may be recorded on the blockchain, the user may not be able to access them without the private key.

Tokens

A token may refer to an entry in the blockchain that belongs to a blockchain address. The entry may comprise information indicating ownership of an asset. The token may represent money, a contract, property, records, access rights, status, supply, demand, alarm, trigger, reputation, ticket, or any other asset that may be represented in digital form. For example, a token may refer to an entry related to cryptocurrency that is used for a specific purpose or may represent ownership of a real-world asset, such as Fiat currency or real-estate. Token contracts refer to cryptographic tokens that represent a set of rules that are encoded in a smart contract. The person that owns the private key corresponding to the blockchain address may access the tokens at the address. Thus, the blockchain address may represent an identity of the person that owns the tokens. Only the owner of the blockchain address may send the token to another person. The tokens may be accessible to the owner via the owner's wallet. The owner of a token may send or transfer the token to a user via a blockchain transaction. For example, the owner may sign the transaction corresponding to the transfer of the token with the private key. When the token is received by the user, the token may be recorded in the blockchain at the blockchain address of the user.

Establishing User Identity

While a digital signature may provide a link between a transaction and an owner of assets being transferred, it may not provide a link to the real identity of the owner. In some cases, the real identity of the owner of the public key corresponding to the digital signature may need to be established. The real identity of an owner of a public key may be verified, for example, based on biometric data, passwords, personal information, etc. Biometric data may comprise any physically identifying information such as fingerprints, face and eye images, voice sample, DNA, human movement, gestures, gait, expressions, heart rate characteristics, temperature, etc.

Publishing and Validating a Block

As discussed above, full nodes 205 may each build their own blocks that include different transactions. A node may build a block by adding validated transactions to the block until the block reaches a certain size that may be specified by the blockchain rules. However, only one of the blocks may be added to the blockchain. The block to be added to the blockchain and the ordering of the blocks may be determined based on a consensus model. In a proof of work model, both nodes may compete to add their respective block to the blockchain by solving a complex mathematical puzzle. For example, such a puzzle may include determining a nonce, as discussed above, such that a hash (using a predetermined hashing algorithm) of the block to be added to the blockchain (including the nonce) has a value that meets a range limitation. If both nodes solve the puzzle at the same time, then a "fork" may be created. When a full node 205 solves the puzzle, it may publish its block to be validated by the validation nodes 205 of the blockchain network 130.

In a proof of work consensus model, a node validates a transaction, for example, by running a check or search through the current ledger stored in the blockchain. The node will create a new block for the blockchain that will include the data for one or more validated transactions (see, e.g., block 375 of FIG. 3). In a blockchain implementation such as Bitcoin, the size of a block is constrained. Referring back to FIG. 3, in this example, the block will include a Previous Block Hash 330 representing a hash of what is currently the last block in the blockchain. The block may also include a hash 370 of its own transaction data (e.g., a so-called Merkle hash). According to a particular algorithm, all or selected data from the block may be hashed to create a final hash value. According to an embodiment of the proof of work model, the node will seek to modify the data of the block so that the final hash value is less than a preset value. This is achieved through addition of a data value referred to as a nonce 360. Because final hash values cannot be predicted based on its input, it is not possible to estimate an appropriate value for the nonce 360 that will result in a final hash value that is less than the pre-set value. Accordingly, in this embodiment, a computationally-intensive operation is needed at the node to determine an appropriate nonce value through a "brute force" trial-and-error method. Once a successful nonce value is determined, the completed block is published to the blockchain network for validation. If validated by a majority of the nodes in the block chain network, the completed block is added to the blockchain at each participating node. When a node's block is not added to the blockchain, the block is discarded and the node proceeds to build a new block. The transactions that were in the discarded block may be returned to a queue and wait to be added to a next block. When a transaction is discarded or returned to the queue, the assets associated with the discarded transaction are not lost, since a record of the assets will exist in the blockchain. However, when a transaction is returned to the queue it causes a delay in completing the transaction. Reducing the time to complete a transaction may be important. A set of blockchain rules, or renumeration/compensation for a node to process the returned transaction may determine how a returned transaction is to be treated going forward. When a transaction is put into a pool then it can have a priority level but then a rule may indicate that the transaction priority level must exceed a threshold level. The priority level of a returned or discarded transaction may be increased. Another way to reduce the time to complete a transaction is to have the system, service provider, participant in the transaction, or merchant pay additional incentive for nodes to process a returned transaction. As an example, a service provider may identify a network of preferred miners based on geography or based on a volume discount perspective. The time to complete a transaction may be optimized by routing a returned transaction to specific preferred nodes. A transaction may be associated with an address that limits which of the preferred nodes will get to process the transaction if it is returned due to its inclusion in a discarded block. A value may be associated with the transaction so that it goes to preferred miners in a specific geographic location. Additionally, returned transactions may be processed based on pre-set rules. For example, a rule may indicate a commitment to process a specific number of returned transactions to receive additional incentive or compensation.

Blockchain Confirmations

After a block comprising a transaction is added to a blockchain, a blockchain confirmation may be generated for the transaction. The blockchain confirmation may be a number of blocks added to the blockchain after the block that includes the transaction. For example, when a transaction is broadcast to the blockchain, there will be no blockchain confirmations associated with the transaction. If the transaction is not validated, then the block comprising the transaction will not be added to the blockchain and the transaction will continue to have no blockchain confirmations associated with it. However, if a block comprising the transaction is validated, then each of the transactions in the block will have a blockchain confirmation associated with the transaction. Thus, a transaction in a block will have one blockchain confirmation associated with it when the block is validated. When the block is added to the blockchain, each of the transactions in the block will have two blockchain confirmations associated with it. As additional validated blocks are added to the blockchain, the number of blockchain confirmations associated with the block will increase. Thus, the number of blockchain confirmations associated with a transaction may indicate a difficulty of overwriting or reversing the transaction A higher valued transaction may require a larger number of blockchain confirmations before the transaction is executed.

Consensus Models

As discussed above, a blockchain network may determine which of the full nodes 205 publishes a next block to the blockchain. In a permissionless blockchain network, the nodes 205 may compete to determine which one publishes the next block. A node 205 may be selected to publish its block as the next block in the blockchain based on consensus model. For example, the selected or winning node 205 may receive a reward, such as a transaction fee, for publishing its block, for example. Various consensus models may be used, for example, a proof of work model, a proof of stake model, a delegated proof of stake model, a round robin model, proof of authority or proof of identity model, and proof of elapsed time model.

In a proof of work model, a node may publish the next block by being the first to solve a computationally intensive mathematical problem (e.g, the mathematical puzzle described above). The solution serves as "proof" that the node expended an appropriate amount of effort in order to publish the block. The solution may be validated by the full nodes before the block is accepted. The proof of work model, however, may be vulnerable to a 51% attack described below. The proof of stake model is generally less computationally intensive than the proof of work model. Unlike the proof of work model which is open to any node having the computational resources for solving the mathematical problem, the proof of stake model is open to any node that has a stake in the system. The stake may be an amount of cryptocurrency that the blockchain network node (user) may have invested into the system. The likelihood of a node publishing the next block may be proportional to its stake. Since this model utilizes fewer resources, the blockchain may forego a reward as incentive for publishing the next block. The round robin model is generally used by permissioned blockchain networks. Using this model, nodes may take turns to publish new blocks. In the proof of elapsed time model, each publishing node requests a wait time from a secure hardware within their computer system. The publishing node may become idle for the duration of the wait time and then creates and publishes a block to the blockchain network. As an example, in cases where there is a need for speed and/or scalability (e.g. in the context of a corporate environment), a hybrid blockchain network may switch to be between completely or partially permissioned and permissionless. The network may switch based on various factors, such as latency, security, market conditions, etc.

Forks

As discussed above, consensus models may be utilized for determining an order of events on a blockchain, such as which node gets to add the next block and which node's transaction gets verified first. When there is a conflict related to the ordering of events, the result may be a fork in the blockchain. A fork may cause two versions of the blockchain to exist simultaneously. Consensus methods generally resolve conflicts related to the ordering of events and thus, prevent forks from occurring. In some cases, a fork may be unavoidable. For example, with a proof of work consensus model, only one of the nodes competing to solve a puzzle may win by solving its puzzle first. The winning node's block is then validated by the network. If the winning node's block is successfully validated by the network, then it will be the next block added to the blockchain. However, it may be the case that two nodes may end up solving their respective puzzles at the same time. In such a scenario, the blocks of both winning nodes may be broadcast to the network. Since different nodes may receive notifications of a different winning node, the nodes that receive notification of the first node as the winning node may add the first node's block to their copy of the blockchain. Nodes that receive notification of the second node as the winning node may add the second node's block to their copy of the blockchain. This results in two versions of the blockchain or a fork. This type of fork may be resolved by the longest chain rule of the proof of work consensus model. According to the longest chain rule, if two versions of the blockchain exist, then the network the chain with a larger number of blocks may be considered to be the valid blockchain. The other version of the blockchain may be considered as invalid and discarded or orphaned. Since the blocks created by different nodes may include different transactions, a fork may result in a transaction being included in one version of the blockchain and not the other. The transactions that are in a block of a discarded blockchain may be returned to a queue and wait to be added to a next block.

In some cases, forks may result from changes related to the blockchain implementation, for example, changes to the blockchain protocols and/or software. Forks may be more disruptive for permissionless and globally distributed blockchain networks than for private blockchain networks due to their impact on a larger number of users. A change or update to the blockchain implementation that is backwards compatible may result in a soft fork. When there is a soft fork, some nodes may execute the update blockchain implementation while other nodes may not. However, nodes that do not update to the new blockchain implementation may continue to transact with updated nodes.

A change to the blockchain implementation that is not backwards compatible may result in a hard fork. While hard forks are generally intentional, they may also be caused by unintentional software bugs/errors. In such a case, all publishing nodes in the network may need to update to the new blockchain implementation. While publishing nodes that do not update to the new blockchain implementation may continue to publish blocks according to the previous blockchain implementation, these publishing nodes may reject blocks created based on the new blockchain implementation and continue to accept blocks created based on the previous blockchain implementation. Therefore, nodes on different hard fork versions of the blockchain may not be able to interact with one another. If all nodes move to the new blockchain implementation, then the previous version may be discarded or abandoned. However, it may not be practical or feasible to update all nodes in the network to a new blockchain implementation, for example, if the update invalidates specialized hardware utilized by some nodes.

Blockchain Based Applications

The following sections describe various blockchain based systems and uses for trusted blockchain bridges according to various embodiments, although use of trusted blockchain bridges is not limited to such systems and uses.

Cryptocurrency

Cryptocurrency is a medium of exchange that may be created and stored electronically in a blockchain, such as the blockchain 130a in FIG. 1. Bitcoin is one example of cryptocurrency, however there are several other cryptocurrencies. Various encryption techniques may be used for creating the units of cryptocurrency and verifying transactions. As an example, the first user 110 may own 10 units of a cryptocurrency. The blockchain 130a may include a record indicating that the first user 110 owns the 10 units of cryptocurrency. The first user 110 may initiate a transfer of the 10 units of cryptocurrency to the second user 115 via a wallet application executing on the first client device 120. The wallet application may store and manage a private key of the first user 110. Examples of the wallet device include a personal computer, a laptop computer, a smartphone, a personal data assistant (PDA), etc.

Figure 6A:
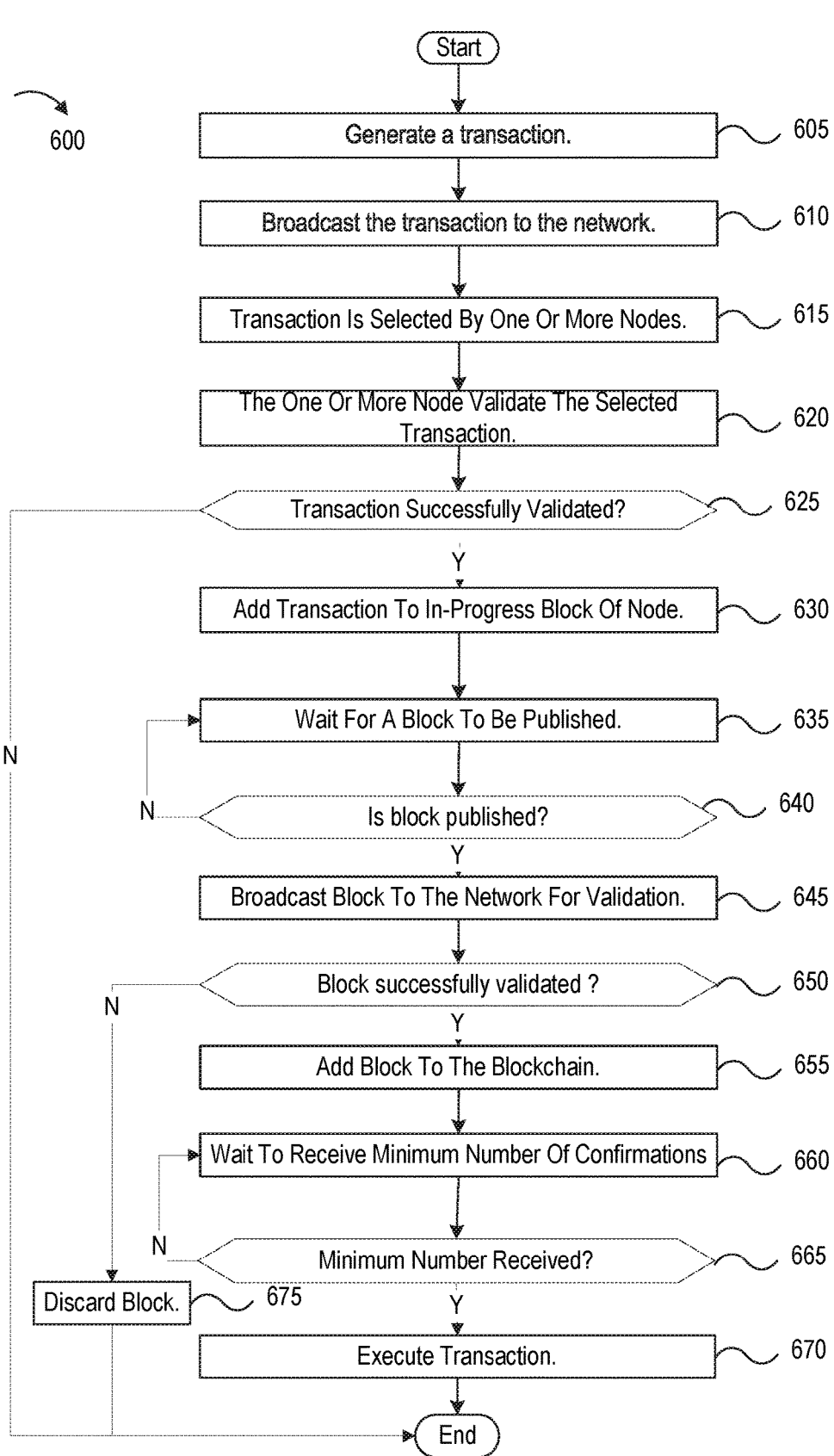
FIG. 6A is a flow diagram showing steps of an example method for performing a blockchain based transaction.

FIG. 6A is a flow diagram showing steps of an example method 600 for performing a blockchain transaction between entities, such as the first user 110 of the first client device 120 and the second user 115 of the second client device 125 in FIG. 1. The steps of the method 600 may be performed by any of the computing devices shown in FIG. 1. Alternatively or additionally, some or all of the steps of the method 600 may be performed by one or more other computing devices. Steps of the method 600 may be modified, omitted, and/or performed in other orders, and/or other steps added.

At step 605, the wallet application may generate transaction data for transferring the 10 units of cryptocurrency from the first user 110 to the second user 120. The wallet application may generate a public key for the transaction using the private key of the first user 110. In order to indicate that the first user 110 is the originator of the transaction, a digital signature may also be generated for the transaction using the private key of the first user 110. As discussed with reference to FIG. 4, the transaction data may include information, such as a blockchain address of the sender 430, the digital signature 455, transaction output information 460, and the public key of the sender 415. The transaction data may be sent to the server 150 from the first client device 125.

The server 150 may receive the transaction data from the first client device 125. At step 610, the server 150 may broadcast the transaction to the blockchain network 130a. The transaction may be received by one or more nodes 205 of the blockchain network 130a. At step 615, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 620, each of the nodes 205 that selected the transaction may validate the transaction. Validating the transaction may include determining whether the transaction is legal or conforms to a pre-defined set of rules for that transaction, establishing user authenticity, and establishing transaction data integrity. At step 625, if the transaction is successfully validated by a node 205, the validated transaction is added to a block being constructed by that node 205. As discussed above, since different nodes 205 may choose to validate different transactions, different nodes 205 may build or assemble a block comprising different validated transactions. Thus, the transaction associated with the first user 110 transferring 10 units of cryptocurrency to the second user 115 may be included in some blocks and not others.

At step 635, the blockchain network 130a may wait for a block to be published. Validated transactions may be added to the block being assembled by a node 205 until it reaches a minimum size specified by the blockchain. If the blockchain network 130a utilizes a proof of work consensus model, then the nodes 205 may compete for the right to add their respective blocks to the blockchain by solving a complex mathematical puzzle. The node 205 that solves its puzzle first wins the right to publish its block. As compensation, the winning node may be awarded a transaction fee associated with the transaction (e.g., from the wallet of the first user 110). Alternatively, or in addition, the winning node may be awarded compensation as an amount of cryptocurrency added to an account associated with the winning node from the blockchain network (e.g., "new" units of cryptocurrency entering circulation). This latter method of compensation and releasing new units of cryptocurrency into circulation is sometimes referred to as "mining." At step 640, if a block has not been published, then the process 600 returns to step 635 and waits for a block to be published.

However, at step 640, if a block has been published, then the process 600 proceeds to step 645.

At step 645, the published block is broadcast to the blockchain network 130a for validation. At step 650, if the block is validated by a majority of the nodes 205, then at step 655, the validated block is added to the blockchain 220. However, at step 650, if the block is not validated by a majority of the nodes 205, then the process 600 proceeds to step 675. At step 675, the block is discarded and the transactions in the discarded block are returned back to the queue. The transactions in the queue may be selected by one or more nodes 205 for the next block. The node 205 that built the discarded block may build a new next block.

At step 660, if the transaction was added to the blockchain 220, the server 150 may wait to receive a minimum number of blockchain confirmations for the transaction. At step 665, if the minimum number of confirmations for the transaction have not been received, then the process may return to step 660. However, if at step 665, the minimum number of confirmations have been received, then the process proceeds to step 670. At step 670, the transaction may be executed and assets from the first user 110 may be transferred to the second user 115. For example, the 10 units of cryptocurrency owned by the first user 110 may be transferred from a financial account of the first user 110 to a financial account of the second user 115 after the transaction receives at least three confirmations.

Smart Contracts

A smart contract is an agreement that is stored in a blockchain and automatically executed when the agreement's predetermined terms and conditions are met. The terms and conditions of the agreement may be visible to other users of the blockchain. When the pre-defined rules are satisfied, then the relevant code is automatically executed. The agreement may be written as a script using a programming language such as Java, C++, JavaScript, VBScript, PHP, Perl, Python, Ruby, ASP, Tcl, etc. The script may be uploaded to the blockchain as a transaction on the blockchain.

As an example, the first user 110 (also referred to as tenant 110) may rent an apartment from the second user 115 (also referred to as landlord 115). A smart contract may be utilized between the tenant 110 and the landlord 115 for payment of the rent. The smart contract may indicate that the tenant 110 agrees to pay next month's rent of $1000 by the $28^{th}$ of the current month. The agreement may also indicate that if the tenant 110 pays the rent, then the landlord 115 provides the tenant 110 with an electronic receipt and a digital entry key to the apartment. The agreement may also indicate that if the tenant 110 pays the rent by the $28^{th}$ of the current month, then on the last day of the current month, both the entry key and the rent are released respectively to the tenant 110 and the landlord 115.

Figure 6B:
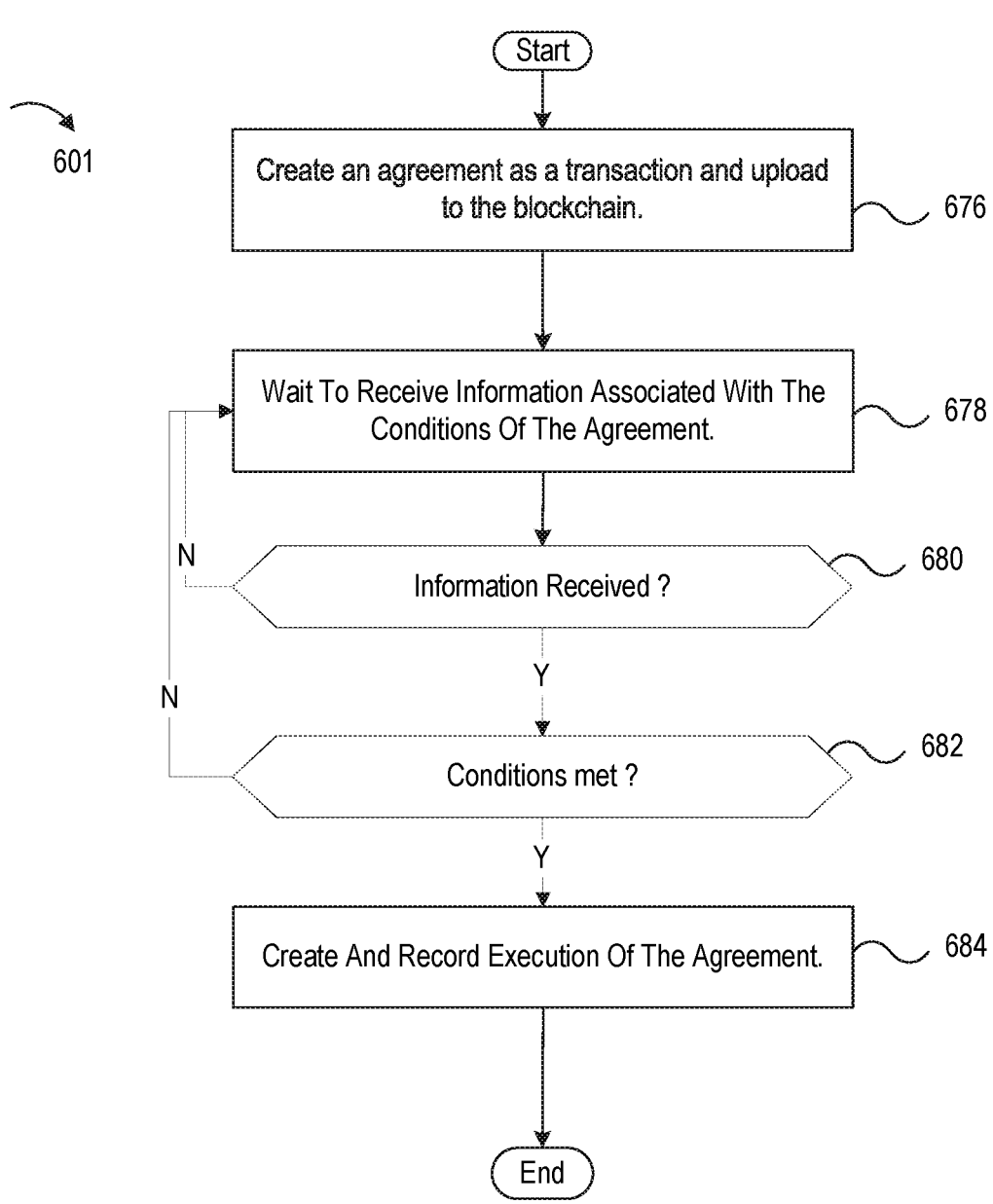
FIG. 6B is a flow diagram showing steps of an example method for performing a blockchain based transaction.

FIG. 6B is a flow diagram showing steps of an example method 601 for performing a smart contract transaction between entities, such as the tenant 110 and the landlord 115. The steps of the method 601 may be performed by any of the computing devices shown in FIG. 1. Alternatively or additionally, some or all of the steps of the method 601 may be performed by one or more other computing devices. Steps of the method 601 may be modified, omitted, and/or performed in other orders, and/or other steps added.

At step 676, the agreement or smart contract between the tenant 110 and the landlord 115 may be created and then submitted to the blockchain network 130a as a transaction.

The transaction may be added to a block that is mined by the nodes 205 of the blockchain network 130a, the block comprising the transaction may be validated by the blockchain network 130a and then recorded in the blockchain 220 (as shown in steps 610-655 in FIG. 6A). The agreement associated with the transaction may be given a unique address for identification.

At step 678, the process 601 waits to receive information regarding the conditions relevant for the agreement. For example, the process 601 may wait to receive notification that $1000 was sent from a blockchain address associated with the tenant 110 and was received at a blockchain address associated with the landlord 115 by the $28^{th}$ of the current month. At step 680, if such a notification is not received, then the process 601 returns to step 678. However, if at step 680, a notification is received, then the process 601 proceeds to step 682.

At step 682, based on determining that the received notification satisfies the conditions needed to trigger execution of the various terms of the smart contract, the process 601 proceeds to step 684. However, at step 682, if it is determined that the received notification does not satisfy the conditions needed to trigger execution of the smart contract, then the process 601 returns to step 678. At step 683, the process 601 creates a transaction associated with execution of the smart contract. For example, the transaction may include information of the payment received, the date the payment was received, an identification of the tenant 110 and an identification of the landlord 115. The transaction may be broadcast to the blockchain network 130a and recorded in the blockchain 220 (as shown in steps 610-655 of the process 600 of FIG. 6A). If the transaction is successfully recorded in the blockchain 220, the transaction may be executed. For example, if the payment was received on the $28^{th}$, then an electronic receipt may be generated and sent to the tenant 110. However, on the last day of the current month, both the digital entry key and the rent are released respectively to the tenant 110 and the landlord 115.

Smart contracts may execute based on data received from entities that are not on the blockchain or off-chain resources. For example, a smart contract may be programmed to execute if a temperature reading from a smart sensor or IoT sensor falls below 10 degrees. Smart contracts are unable to pull data from off-chain resources. Instead, such data needs to be pushed to the smart contract. Additionally, even slight variations in data may be problematic since the smart contract is replicated across multiple nodes of the network. For example, a first node may receive a temperature reading of 9.8 degrees and a second node may receive a temperature reading of 10 degrees. Since validation of a transaction is based on consensus across nodes, even small variations in the received data may result in a condition of the smart contract to be evaluated as being not satisfied. Third party services may be utilized to retrieve off-chain resource information and push this to the blockchain. These third party services may be referred to as oracles. Oracles may be software applications, such as a big data application, or hardware, such as an IoT or smart device. For example, an oracle service may evaluate received temperature readings beforehand to determine if the readings are below 10 degrees and then push this information to the smart contract. However, utilizing oracles may introduce another possible point of failure into the overall process. Oracles may experience errors, push incorrect information or may even go out of business.

Since blockchains are immutable, amending or updating a smart contract that resides in a blockchain may be challenging and thus, more expensive and/or more restrictive than with text-based contracts.

Internet of Things (IOT)

An IoT network may include devices and sensors that collect data and relay the data to each other via a gateway. The gateway may translate between the different protocols of the devices and sensors as well as manage and process the data. IoT devices may, for example, collect information from their environments such as motions, gestures, sounds, voices, biometic data, temperature, air quality, moisture, and light. The collected information may be sent over the Internet for further processing. Typically, IoT devices use a low power network, Bluetooth, Wi-Fi, or satellite to connect to the Internet or "the cloud". Some IoT related issues that blockchain may be able to detect include a lack of compliance in the manufacturing stage of an IoT device. For example, a blockchain may track whether an IoT device was adequately tested.

As discussed above, information from off-chain resources, including IoT devices, may be pushed to smart contracts via third party entities known as oracles. As an example, a smart refrigerator may monitor the use of an item stored in the refrigerator, such as milk. Various sensors within the refrigerator may be utilized for periodically determining an amount of milk stored in the refrigerator. A smart contract stored in a blockchain may indicate that if the weight of the stored milk falls below 10 ounces, then a new carton of milk is automatically purchased and delivered. The refrigerator sensors may periodically send their readings to a third party service or oracle. The oracle may evaluate the sensor readings to determine whether the conditions for purchasing a new carton of milk have been met. Upon determining that the weight of the stored milk is below 10 ounces, the oracle may push information to the smart contract indicating that the condition for executing the smart contract has been met. The smart contract may execute and a new carton of milk may be automatically purchased. Both the execution of the smart contract and the purchase of the new carton may be recorded in the blockchain. In some cases, the condition may be an occurrence of an event, such as a need or anticipated need, or convenience factors, such as a delivery day, cost, promotions, or incentives.

Some issues related to the integration of blockchain into IoT include speed of transactions and computational complexity. The speed at which transactions are executed on the blockchain may be important when IoT networks with hundreds or thousands of connected devices are all functioning and transacting simultaneously. IoT devices are generally designed for connectivity rather than computation and therefore, may not have the processing power to support a blockchain consensus algorithm, such as proof of work. IoT devices also tend to be vulnerable to hacking via the Internet and/or physical tampering. For example, IoT devices may be more vulnerable to DDOS and malware attacks. Hackers may target a specific network and begin spamming the network with traffic within a short amount of time. Because of the increased surge in traffic, the bandwidth may be quickly overloaded, and the entire system may crash.

Supply Chain Monitoring and Logistics

A supply chain for a product may include a network of entities and activities that are involved in the creation of the product and its eventual sale to a customer. A blockchain based record of the supply chain for a product may be utilized, for example, to trace the provenance of parts and materials and to prevent counterfeit parts from entering the supply chain. Blockchain integration into the supply chain for a product may utilize IoT devices and data, oracles, and smart contracts. For example, an RFID tag may be attached to a product in order to physically track the product and record its location within the supply chain. Additionally, smart contracts may be utilized to record the various activities and interactions between entities that are involved in the product's supply chain. As discussed above with reference to FIGS. 6A and 6B, any data or information that may be digitally represented and electronically stored may be recorded in a blockchain by submitting the data as part of a blockchain transaction. When the transaction is included in a validated block that is added to the blockchain, the transaction and its associated data is recorded in the blockchain.

As an example, a permissioned blockchain may be utilized for recording and monitoring the entities and activities involved in food distribution, such as fruit or vegetables. The blockchain may be accessible to entities, such as the suppliers of seed and pesticides, farmers, distributors, grocery stores, customers, and regulators. The blockchain may record activities such as the sale of a pesticide and/or seed to the farmer, the harvesting and packaging of the fruit, its shipment to distributors' warehouses, its arrival at various stores, and eventual purchase by a consumer. Sensors and RFID devices may be utilized for tracking the fruit through the supply chain. For example, the fruit may be packaged in crates tagged with a unique RFID device. When the tagged crate is loaded onto a truck for shipment from the farm to a distributor, the crate may be scanned and a record of its shipment may be uploaded to the blockchain. When the crate arrives at a warehouse, it may be scanned again and a record of its arrival at the warehouse may be uploaded to the blockchain. Additionally, smart contracts may be executed throughout the supply chain. For example, when the crate is scanned at the warehouse, a smart contract between the farmer and the warehouse may be executed indicating that the crate was successfully shipped from the farmer to the warehouse and received by the warehouse.

As another example, a permissioned blockchain for an automobile may store a record of entities and activities related to a component that is utilized in the manufacturing of the automobile. The blockchain may be accessible to various entities, such as automobile OEMs, distributors and suppliers of materials and components, dealerships, mechanics, insurance providers, and others. While evaluating an accident involving a policy holder's automobile, an insurance provider 110 may determine that the accident may have been caused by a defective component used in a wheel of the automobile. The insurance provider 110 may wish to trace a provenance of the component based on information recorded in the permissioned blockchain. The insurance provider 110 may query the blockchain data for information related to the component via, for example, a blockchain querying application executing on the first client device 120. The query may include identifying information associated with the component. For example, the component may be marked with an identification that is unique to the component or a group of components. The results of the query may include records in the blockchain of the entities and activities that were involved in the creation of the component and its eventual sale to the automobile manufacturer.

Blockchain Enabled In-Store Purchasing

Figure 8:
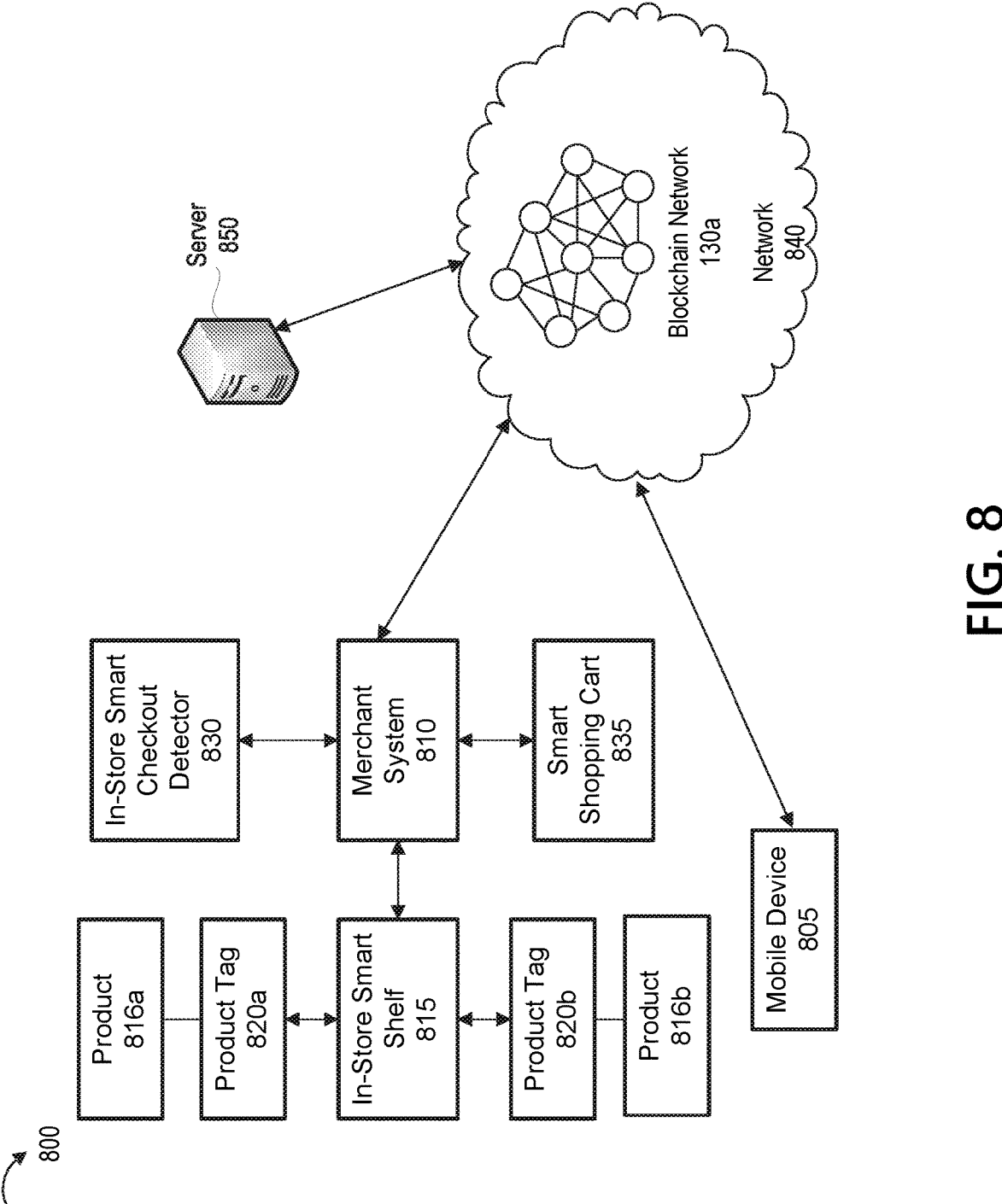
FIG. 8 illustrates an example of a blockchain enabled in-store purchase system.

An example of blockchain enabled in-store purchasing is described with reference to a system 800 shown in FIG. 8, the process 600 shown in FIG. 6A and the process 601 shown in FIG. 6B. FIG. 8 illustrates an example of a blockchain enabled in-store purchase system 800. The system 800 includes a mobile device 805, a merchant system 810, and a server 850 connected via a network 840. The merchant system 810 may be connected via a local wireless network to various IoT devices within a store, for example, an in-store smart shelf 815, and an in-store smart checkout detector 830.

The store may include one or more smart shelves, such as the in-store smart shelf 815. The smart shelf 815 may include an RFID tag, an RFID reader, and an antenna. One or more products may be stored on the in-store smart shelf 815. Each product may include an RFID tag, such as a first product tag 820*a* attached to a first product 816*a* and a second product tag 820*b* attached to a second product 816*b*. The in-store smart shelf 815 may, based on reading the product tags 820*a* and 820*b*, send information about the products 816*a* and 816*b* throughout the day to the merchant system 810. The merchant system 810 may in turn update an inventory of products currently within the store.

A shopper may travel through the store with the mobile device 805. A digital shopping list on the mobile device 805 may include a list of items that the shopper may need to purchase. For example, the shopping list may include an item that matches the first product 816*a*. When the shopper is close to the in-store smart shelf 815, the mobile device 805 may notify the shopper that the first product 816*a* is currently available on the in-store smart shelf 815. The shopper may remove the first product 816*a* from the in-store smart shelf 815 and place it into a smart shopping cart 835. The smart shopping cart 835 may read the first product tag 820*a* as well as the product tags attached to other products that may have been placed in the smart shopping cart 835. When the shopper is ready to checkout, the shopper may walk out of the store with the shopping cart 835. As the shopper walks out of the store, the in-store smart checkout detector 830 may detect the smart shopping cart 835. The smart shopping cart 835 may communicate with the in-store smart checkout detector 830 and transmit information about the products in the smart shopping cart. The in-store smart checkout detector 830 may send information about the products, such as the first product 816*a*, and payment information from the mobile device 805 to the merchant system 810. The merchant system 810 may receive information from the in-store smart checkout detector 830 and the payment information and proceed to initiate purchase of the first product 816*a*.

Referring to step 605 of the process 600 shown in FIG. 6A, a wallet application on the mobile device 805 may generate transaction data for transferring an amount of cryptocurrency matching the sale price of the first product 816*a* from the shopper to the merchant. The wallet application may generate a public key for the transaction using the private key of the shopper. In order to indicate that the shopper is the originator of the transaction, a digital signature may also be generated for the transaction using the private key of the shopper. The transaction data may be sent to the server 850 from the mobile device 805.

The server 850 may receive the transaction data from the mobile device 805. At step 610, the server 850 may broadcast the transaction to the blockchain network 130*a*. The transaction may be received by one or more nodes 205 of the blockchain network 130*a*. At step 615, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 620, each of the nodes 205 that selected the transaction may validate the transaction. At step 625, if the transaction is successfully validated by a node 205, the validated transaction is added to a block being constructed by that node 205. At step 635, the blockchain network 130*a* may wait for a block to be published. At step 640, if a block has not been published, then the process 600 returns to step 635 and waits for a block to be published. However, at step 640, if a block has been published, then the process 600 proceeds to step 645.

At step 645, the published block is broadcast to the blockchain network 130*a* for validation. At step 650, if the block is validated by a majority of the nodes 205, then at step 655, the validated block is added to the blockchain 220. At step 660, if the transaction was added to the blockchain 220, the server 850 may wait to receive a minimum number of blockchain confirmations for the transaction. At step 665, if the minimum number of confirmations for the transaction have not been received, then the process may return to step 660. However, if at step 665, the minimum number of confirmations have been received, then the process proceeds to step 670. At step 670, the transaction may be executed and the sale price of the first product 816*a* may be transferred from the shopper to the merchant.

When the in-store smart checkout detector 830 sends information about the products, such as the first product 816*a*, and payment information from the mobile device 805 to the merchant system 810, a smart contract may be created between the shopper and the merchant and executed according to the process 601 shown in FIG. 6B. For example, at step 676, a smart contract between the shopper and the merchant may be created and then submitted to the blockchain network 130*a* as a transaction. For example, at step 678, the process 601 may wait to receive notification that an amount of cryptocurrency equal to the sale price of the first product 816*a* was sent from a blockchain address associated with the shopper and was received at a blockchain address associated with the merchant by the time the first product 816*a* is removed from the smart shopping cart 835. If the payment for the first product 816*a* was successfully transferred from the shopper to the merchant by the time the shopper removes the first product 816*a* from the smart shopping cart 835, then an electronic receipt may be generated and sent to the shopper. Otherwise, the merchant system 815 may be alerted that the shopper is attempting to leave the premises without paying for the first product 816*a*.

Blockchain Enabled In-Vehicle Purchasing

Figure 9:
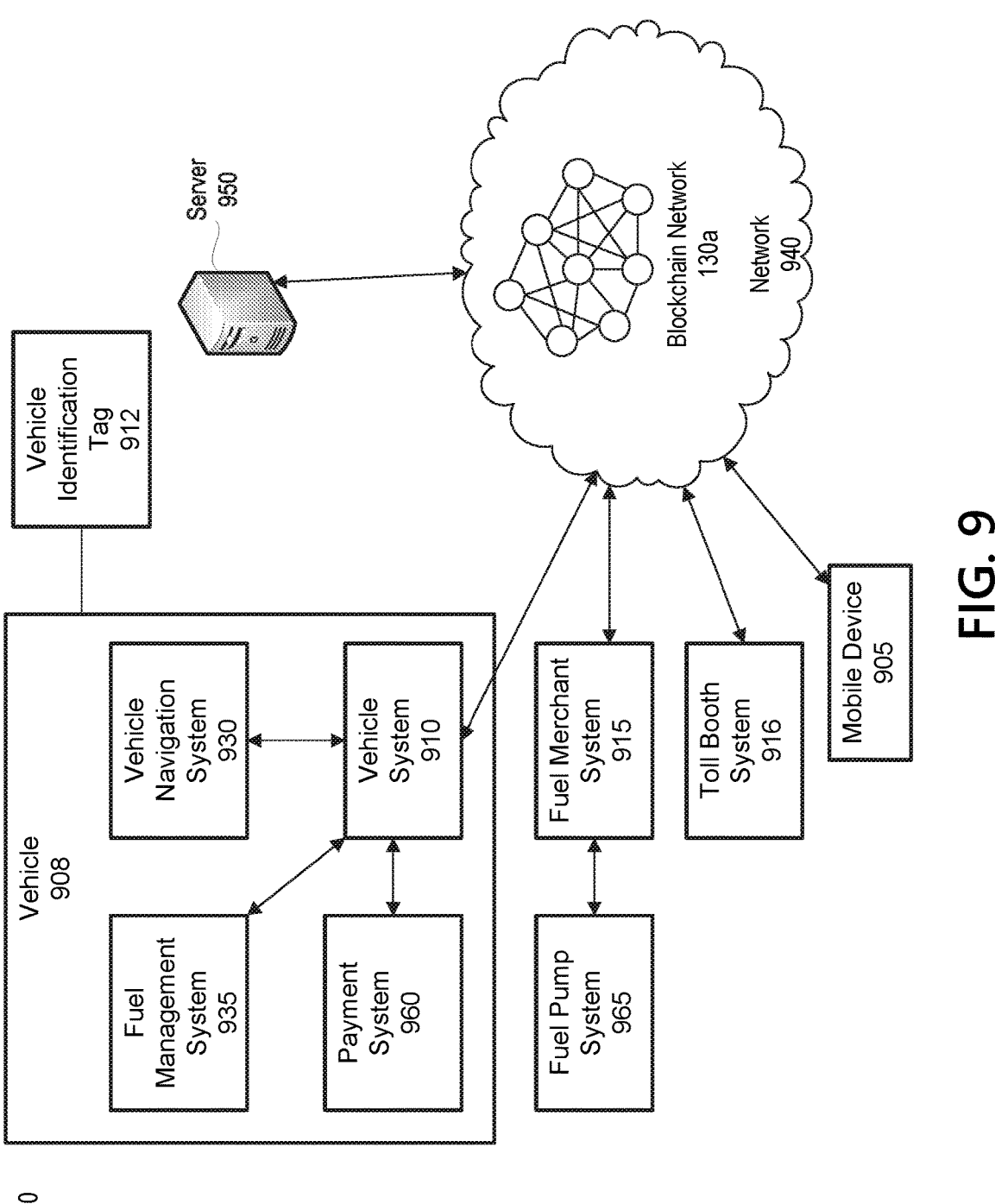
FIG. 9 illustrates an example of communications for an IoT blockchain enabled device system.

An example of blockchain enabled in-vehicle purchasing is described with reference to the system 900 shown in FIG. 9, the process 600 shown in FIG. 6A and the process 601 shown in FIG. 6B. FIG. 9 illustrates an example system 900 for blockchain enabled in-vehicle purchasing. The system 900 includes an IoT enable smart vehicle 908. The vehicle 908 may include one or more computing devices implementing a vehicle system 910, a vehicle navigation system 930, a payment system 960 and a fuel management system 935. The vehicle 908 may include a RFID tag, such as a vehicle identification tag 912. The system 900 may also include various merchant systems, such as a fuel merchant system 915, and a toll booth system 916. The system 900 may also include a mobile device 905 belonging to a driver of the vehicle 908.

When the driver gets into the vehicle 908, payment information may be loaded from the driver's mobile device 905 into the vehicle payment system 910 so it is available for secure payments to other devices in order to complete in-vehicle purchases, such as in-vehicle purchase of fuel and in-vehicle payment of tolls. The driver of the smart vehicle may pay for parking, fast food, using the IoT enabled smart vehicle 908. Additionally, the IoT enabled smart vehicle 908 may also facilitate in-vehicle purchasing of smartphone apps, music, audio books, and other goods and services.

The fuel management system 935 may perform various functions related to fuel usage and communicate with the vehicle system 916. For example, the fuel management system 935 may monitor fuel usage and based on detecting that the fuel is below a threshold, notify the vehicle system 910. The vehicle system 910 may communicate with the vehicle navigation system 930 to determine nearby fuel stations. The selection of a fuel station to may be based on various factors, such as the availability of fuel at nearby fuel stations, the vehicle's current route and location, incentives that may be offered by nearby fuel stations, etc. The vehicle system 910 may notify the driver about the selection of a fuel station and the vehicle 908 may be re-routed to the selected fuel station. Upon arriving at the selected fuel station, the driver may pull up to a fuel pump. The fuel pump may include a fuel pump system 965 configured to detect the RFID tags of vehicles, such as the vehicle identification tag 912 in order to obtain an identification of the vehicles. The fuel pump system 965 and the payment system 960 may be configured to communicate with each other. The fuel payment system 960 may send payment information to the fuel pump system 965. After the driver has completed re-fueling, the driver may simply drive away. The fuel pump system 965 may send the fuel merchant system 915 information about the identification of the vehicle 908, the amount of fuel purchased, and the payment information. The fuel merchant system 915 may use the information to complete a transaction with the driver for the purchase of the fuel. For example, the fuel merchant system 915 may communicate with the server 950 to charge the driver for the fuel according to the process 600 shown in FIG. 6A. Additionally, the fuel merchant system 915 may communicate with the server 950 in order to create a smart contract between the driver and the fuel merchant. The smart contract may be created and executed according to the process 601 shown in FIG. 6B.

Augmented Reality (AR), Mixed Reality and Blockchain Based E-Commerce

AR or mixed reality enabled devices, such as wearable smart glasses, head mounted devices, holographic devices, or smartphone applications overlay digital content on top of a real world view, thus, enhancing a user's experience of the real world. The overlay content may be 3D models generated based on 3D scanning real world objects. AR enables users to experience online shopping in a virtual environment. For example, using AR, browse virtual stores and view 3D models of items for sale in virtual stores. Just as in the real world, customers may be able to handle and examine various physical details of the products. Blockchain smart contracts may be utilized to provide an e-commerce platform where customers may purchase items from online merchants with cryptocurrency and digital wallets. Information about a product, such as country of origin, materials, ingredients, price, description, measurements, terms and conditions, 3D model of the physical product, etc., may be hashed and recorded in a blockchain. This provides proof of ownership of virtual goods and products and enables accurate tracking of any changes made to this information. Artificial intelligence (AI) may be utilized for generating 3D models of products based on 2D images of the products. Smart contracts may be utilized to conduct transactions between merchants and customers.

As an example, a customer may shop for clothing by browsing different stores in a virtual shopping mall via a wearable AR device, such as a pair of smart glasses. The customer may examine a 3D model of a shirt as he or she would in the real world. Additionally, the customer may virtually try on the shirt using a 3D model of the customer's body. If the customer decides to purchase the shirt, the customer may initiate a transaction with the merchant of the store. A transaction may be submitted to the blockchain via the customer's digital wallet to transfer money (cryptocurrency) from the customer to the merchant. Various smart contracts may be utilized to implement various aspects of the e-commerce process. For example, based on detecting that the sale price of the shirt has been successfully transferred from the customer to the merchant, a smart contract may be executed to initiate shipment of the shirt from the merchant's warehouse to the customer. As described above with reference to supply chain monitoring and tracking, RFID tags and other IoT devices may be utilized to track the shipment of the shirt from the merchant's warehouse to the delivery of the shirt to the customer's residence.

Quantum Computing

One of the concerns of quantum computing is that it may increase the probability of breaking cryptographic algorithms and thus, weaken overall security for the blockchain. This may be addressed by requiring larger key sizes for blockchain asymmetric-key pairs of cryptographic algorithms. In some cases, if there is a concern that a block may be decrypted in the future, a dynamically changing cryptographic hash may be utilized. A different cryptographic hash may be dynamically selected for a particular block or the entire blockchain based on various factors, such as whether there is a concern that the block will be decrypted in the future, increasing a strength of the hash, utilizing a hash that is better suited for protecting privacy. In some cases, different cryptographic hashes may be selected for different blocks.

Anonymity and Privacy

As discussed above, the use of a private/public key pair to establish user authenticity during validation of a blockchain transaction provides some privacy as it does not reveal user identity. However, the transactions stored on a blockchain may be visible to the public. It has been shown that user identity may be derived from the publicly available transaction information.

Blockchain Size

Depending on a frequency at which events are recorded in a blockchain, the size of the blockchain may grow quickly. Computing/storage capacity (i.e., faster processors, larger storage components) may be needed to support the expansion of the blockchain. In some cases, blocks may be compressed prior to being added to the chain. In some cases, blocks may be eliminated, for example, at the beginning of the blockchain, when they become stale or irrelevant. As an example, a method for "replacing" the first 1000 transactions with a new block that effectively mimics the hash of the 1000 transactions may be useful for managing blockchain size.

Blockchain Immutability

In some cases, content in a blockchain may need to be deleted. For example, content may need to be deleted if there is a security breach or if the content is no longer relevant. A level of immutability of a blockchain may depend on a type of the blockchain. For example, changing content may be difficult in a public blockchain due to its possible impact on a large number of users. According to some techniques, data stored in a private blockchain, or a public blockchain controlled by a few entities may be changed by recording a flag (current block) where the change is being made, and adding the current block (referred to by the flag) to the blockchain. The added block may then indicate the change made to the previous block.

As another example, a blockchain may need to be changed to resolve a broken link. For example, the hash of a changed block may no longer match the hash stored in the block+1. In some cases, the blockchain may need to be changed in order to reverse the results of illegal transactions. In some cases, the blockchain may need to be changed to address software errors, erroneous transactions, or remove information that is confidential or required by law to be removed. If the blockchain is immutable, these errors and information may be permanently embedded in the blockchain. Additionally, the blockchain may need to be changed to comply with regulatory concerns, such as the European Union's incoming General Data Protection Regulation (GDPR), or California Consumer Privacy Act (CCPA), regarding consumer data privacy and ownership rights, US Fair Credit Reporting Act, and the SEC's "Regulation SP," which require that recorded user identifiable personal financial data be redactable.

Some techniques may allow modifications to the blockchain to address software errors, legal and regulatory requirements, etc., by allowing designated authorities to edit, rewrite or remove previous blocks of information without breaking the blockchain. Such techniques may enable blockchain editing by using a variation of a "chameleon" hash function, through the use of secure private keys. This editing may allow smart contracts that were flawed at issue to be updated so that the changes carry over to subsequent smart contracts in the blockchain. Using these techniques, blocks that have been changed may be using a "scar" or mark that cannot be removed, even by trusted parties.

According to some techniques, when a block is hashed, any confidential information, such as personally identifiable information, and IP addresses, is not included in the hash because it is not part of the data values that were hashed. But because there is no hash of the confidential information, it may be changed. According to some techniques, the confidential information may not be placed or recorded into the blockchain. Rather the information may reside in a file that is external to the blockchain. A hash of that file, however, may be recorded in the blockchain. For example, a user's confidential information may be deleted locally without affecting the blockchain.

As another example, assuming that all content included in a block in a blockchain cannot be changed after a block is added to the blockchain, a determination may be made before adding data to the blockchain of whether some or all of that data may need to be deleted at a later time. For example, confidential information (i.e., data to be deleted at a later time) may be stored as a file that is external to the block and the blockchain. For the purposes of creating the block, a link to the file containing the confidential information and a hash of the file containing the confidential information file may be added to the block. An example of a link would be an HTTP link. During confirmation of the block that is to be added to the blockchain, the network nodes may be able to access the confidential information and verify that the confidential information based on the hash value of the file in the block. Because the hash value of the file is a part of the block, the file containing the confidential information may not be easily changed. However, it may be possible to change the confidential information file by changing the data therein and adding a nonce. This may seek to change the nonce until the resulting hash equals the hash that is stored in the blockchain. However, this would be difficult (probably near impossible), and an inspection of the modified confidential information file would reveal the added nonce, which may then raise suspicion that information was changed since it was first added to the blockchain.

Files containing confidential information may be encrypted (e.g., through an asymmetric key encryption function) prior to the hashing operation. When "deleting" the confidential information, the file containing the confidential information may be deleted or removed resulting in the link, which is stored in the blockchain, being ineffective for retrieving the file. The hash of the file, and the link, remain in the blockchain so that the linking of the blocks through hash functions is not affected. However, because of this change, a transaction that is part of the block or part of a different special block could be added to the blockchain to indicate that the link is no longer effective and the confidential information file is no longer part of the blockchain. This may effectively keep confidential information out of the blockchain while providing the confidential information to users of the blockchain and proof of authenticity of the confidential information before it is deleted from the blockchain. This may come with drawbacks because access to data implies that such data may be stored. Accordingly, those with access to the confidential information file, while it was part of the blockchain, may have stored that information in another location that may no longer be reachable during the "deleting" operation discussed above.

51% Attack

A "51% attack" refers to an individual mining node or a group of mining nodes controlling more than 50% of a blockchain network's mining power, also known as hash rate or hash power. The hash rate is a measure of the rate at which hashes are being computed on the blockchain network. As described above, hashing may include taking an input string of a given length, and running it through a cryptographic hash function in order to produce an output of a fixed length. A blockchain network's hash rate may be expressed in terms of 1 KH/s (kilohash per second) which is 1,000 hashes per second, 1 MH/s (megahash per second) which is 1,000,000 hashes per second, 1 TH/s (terahash per second) which is 1,000,000,000,000 hashes per second, or 1 PH/s (petahash per second) which is 1,000,000,000,000,000 hashes per second. As an example, a mining node in a blockchain utilizing a proof of work consensus model (PoW) may perform hashing in order to find a solution to a difficult mathematical problem. The hash rate of the mining node may depend on the computational resources available to that node. A mining node that successfully solves the mathematical problem may be able to add a block to the blockchain. Thus, by ensuring that invalid transactions cannot be included in a block, mining nodes increase the reliability of the network. Transactions may be deemed invalid if they attempt to spend more money than is currently owned or engage in double-spending. If a mining node intentionally or unintentionally includes an invalid transaction in a block, then the block will not be validated by the network. Additionally, nodes that accept the invalid block as valid and proceed to add blocks on top of the invalid block will also end up wasting computational resources. Thus, mining nodes are discouraged from cheating by intentionally adding invalid transactions to blocks and accepting invalid blocks as valid.

An entity may be able to disrupt the network by gaining control of 50% of a network's hash rate. In a 51% attack, a blockchain node may intentionally reverse or overwrite transactions and engage in double-spending. When a node generates a valid block of transactions, it broadcasts the block to the network for validation. In some cases, a node controlling more than 50% of a network's hash rate may mine blocks in private without broadcasting them to the network. In such a scenario, the rest of the network may follow a public version of the blockchain while the controlling node may be following its private version of the blockchain. FIG. 7A shows a fraudulent and valid version of a blockchain. The valid blockchain on the top comprises the valid blocks 705, 710*a*, 715*a*, and 720. The fraudulent blockchain on the bottom is not broadcast to the network and includes the blocks 705, 710*b*, 715*b*, and an invalid block 720.

FIG. 7B shows another fraudulent and valid version of a blockchain. The valid version of the blockchain includes nodes 740, 745*a*, 750*a*, and 755*a*. The fraudulent version of the blockchain includes nodes 740, 745*b*, 750*b*, 755*b*, and 775. However, following the longest chain rule, the network may select and utilize the private or fraudulent blockchain comprising nodes 740, 745*b*, 750*b*, 755*b* and 775. Since it is the longest chain, previous transactions may be updated according to this chain. The cheating node may include transactions that spend money, such as the block 750*b* including the transaction for 150 BTC, on the public or fraudulent version of the blockchain without including these transactions in the private version of the blockchain. Thus, in the private version of the blockchain, the cheating node may continue to own the spent 150 BTC. When the cheating node controls more than 50% of the hashing resources of the network, it may able to broadcast its private version of the blockchain and continue to create blocks on the private blockchain faster than the rest of the network, thus, resulting in a longer blockchain. Since there are two versions of the blockchain, the network may select the longest or fraudulent private blockchain as the valid blockchain. As a result, the rest of the network may be forced to use the longer blockchain. The public or valid version of the blockchain may then be discarded or abandoned and all transactions in this blockchain that are not also in the private or fraudulent version of the blockchain may be reversed. The controlling or cheating node may continue to own the spent money because the spending transactions are not included on the fraudulent version of the blockchain, and the cheating node may therefore, spend that money in future transactions.

Because of the financial resources needed to obtain more hashing power than the rest of the entire network combined, a successful 51% attack may generally be challenging to achieve. However, it would be less expensive to achieve a 51% attack on a network with a lower hash rate than one with a higher hash rate. Additionally, the probability of a successful 51% attack increases with the use of mining pools in which multiple nodes may combine their computational resources, for example, when mining is performed from the same mempool.

Computing Device

Figure 10:
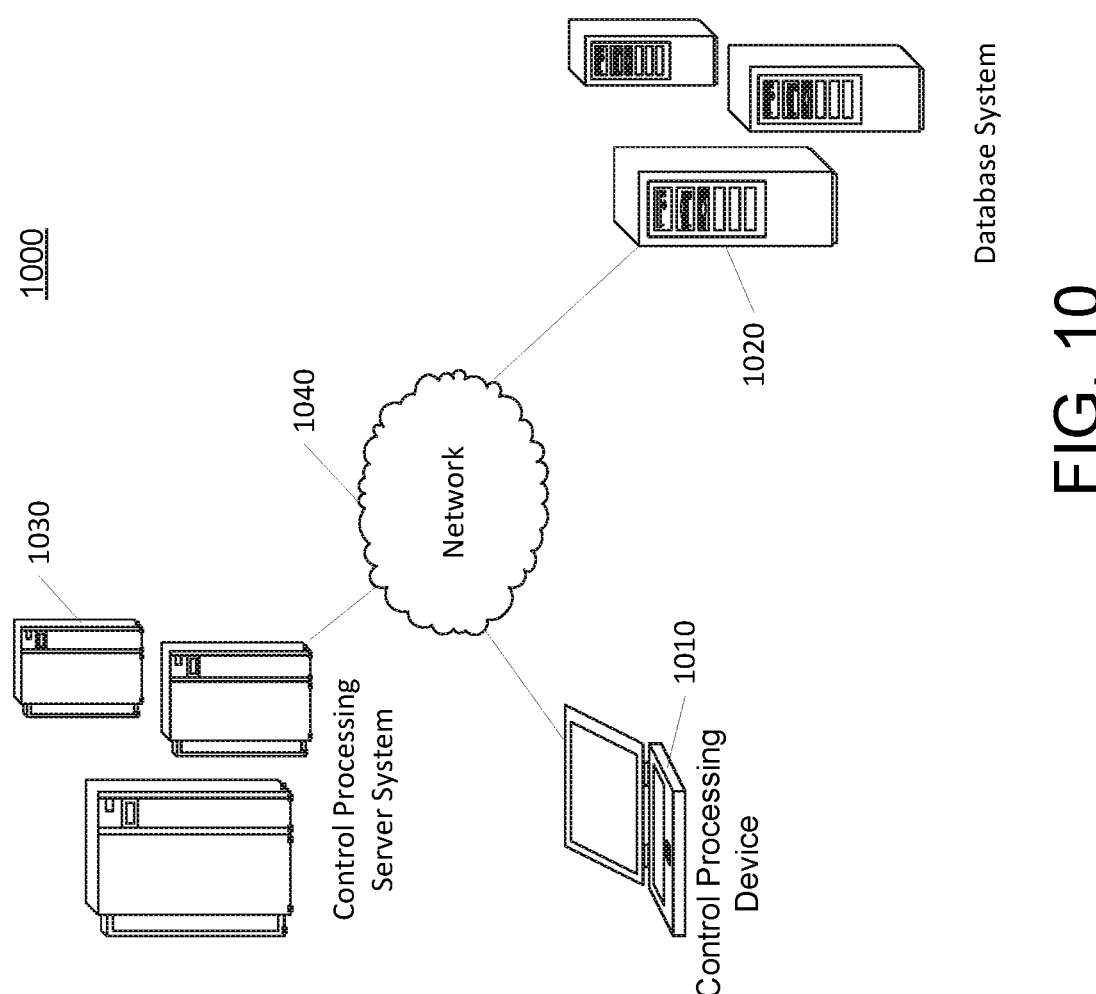
FIG. 10 illustrates an example system.

FIG. 10 shows a system 1000. The system 1000 may include at least one client device 1010, at least one database system 1020, and/or at least one server system 1030 in communication via a network 1040. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 10.

Client device 1010 may access server applications and/or resources using one or more client applications (not shown) as described herein. Client device 1010 may be a mobile device, such as a laptop, smart phone, mobile phones, or tablet, or computing devices, such as a desktop computer or a server, wearables, embedded devices. Alternatively, client device 1010 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 1020 may be configured to maintain, store, retrieve, and update information for server system 1030. Further, database system may provide server system 1030 with information periodically or upon request. In this regard, database system 1020 may be a distributed database capable of storing, maintaining, and updating large volumes of data across clusters of nodes. Database system 1020 may provide a variety of databases including, but not limited to, relational databases, hierarchical databases, distributed databases, in-memory databases, flat file databases, XML databases, NoSQL databases, graph databases, and/or a combination thereof.

Server system 1030 may be configured with a server application (not shown) that is capable of interfacing with client application and database system 1020 as described herein. In this regard, server system 1030 may be a stand-alone server, a corporate server, or a server located in a server farm or cloud-computer environment. According to some examples, server system 1030 may be a virtual server hosted on hardware capable of supporting a plurality of virtual servers.

Network 1040 may include any type of network. For example, network 1040 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 1000 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 1000. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 1000 in front of one or more computing devices such that any external devices may communicate directly with the specialized hardware.

Figure 11:
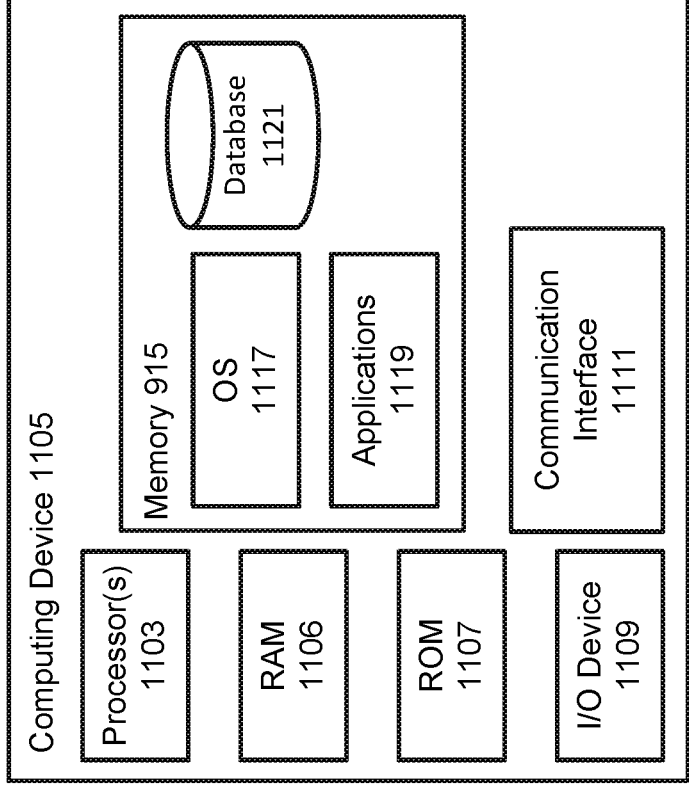
FIG. 11 illustrates an example computing device.

Turning now to FIG. 11, a computing device 1105 that may be used with one or more of the computational systems is described. The computing device 1105 may include a processor 1103 for controlling overall operation of the computing device 1105 and its associated components, including RAM 1105, ROM 1107, input/output device 11011, communication interface 1111, and/or memory 1115. A data bus may interconnect processor(s) 1103, RAM 1105, ROM 1107, memory 1115, I/O device 1109, and/or communication interface 1111. In some embodiments, computing device 1106 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 1109 may include a microphone, keypad, touch screen, and/or stylus motion, gesture, through which a user of the computing device 1100 may provide input, and may also include one or more of a speaker for providing audio output and a video display device for providing textual, audiovisual, and/or graphical output. Software may be stored within memory 1115 to provide instructions to processor 1103 allowing computing device 1100 to perform various actions. For example, memory 1115 may store software used by the computing device 1100, such as an operating system 1117, application programs 1119, and/or an associated internal database 1121. The various hardware memory units in memory 1115 may include volatile and nonvolatile, removable and non-removable media implemented in any method or technology for storage of information such as computer-readable instructions, data structures, program modules, or other data. Memory 1115 may include one or more physical persistent memory devices and/or one or more non-persistent memory devices. Memory 1115 may include, but is not limited to, random access memory (RAM) 1105, read only memory (ROM) 1107, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 1103.

Communication interface 1111 may include one or more transceivers, digital signal processors, and/or additional circuitry and software for communicating via any network, wired or wireless, using any protocol as described herein.

Processor 1103 may include a single central processing unit (CPU), which may be a single-core or multi-core processor, or may include multiple CPUs. Processor(s) 1103 and associated components may allow the computing device 1100 to execute a series of computer-readable instructions to perform some or all of the processes described herein. Although not shown in FIG. 11, various elements within memory 1115 or other components in computing device 1100, may include one or more caches, for example, CPU caches used by the processor 1103, page caches used by the operating system 1117, disk caches of a hard drive, and/or database caches used to cache content from database 1161. For embodiments including a CPU cache, the CPU cache may be used by one or more processors 1103 to reduce memory latency and access time. A processor 1103 may retrieve data from or write data to the CPU cache rather than reading/writing to memory 1115, which may improve the speed of these operations. In some examples, a database cache may be created in which certain data from a database 1121 is cached in a separate smaller database in a memory separate from the database, such as in RAM 1105 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 1105 are described separately, functionality of the various components may be combined and/or performed by a single component and/or multiple computing devices in communication without departing from the invention.

Blockchain Bridges

Current blockchain networks are essentially isolated as all participants of a blockchain network must abide by the rules of the blockchain network so that transactions and other data recorded on the blockchain can be accurate and secure. A significant challenge of blockchains is their lack of interoperability, which may be partially caused by disparate blockchain network protocols for heterogenous blockchains. In some cases, the disparate blockchain network protocols may stem from a lack of trust in the security protocols of other blockchain networks. For example, some blockchain networks may sacrifice security by using less secure cryptographic protocols in favor of quicker block times.

Blockchain bridges enable interoperability between different blockchain networks and between parent blockchains and child blockchains (e.g., sidechains), which may operate under different protocols such as consensus algorithms, cryptographic suites (e.g., cryptographic hash functions), digital signature protocols, private-and-public key encryption protocols, etc. As the number and size of blockchain networks continue to grow, interoperability between blockchain networks may become increasingly important to allow for cross-chain actions such as the transfer/exchange of cryptocurrency, tokens, smart contract instructions, and other data between the blockchain networks, such as described above. For example, blockchain bridges may allow users to deploy digital assets hosted on one blockchain network to decentralized applications (dApps) on another blockchain network, conduct fast, low-cost transactions of tokens hosted on otherwise less scalable blockchains, execute dApps across more than one blockchain network, and so forth.

However, although blockchain bridge solutions exist, the prior solutions are black box or gray box solutions due to development by a third-party or development by a counterparty blockchain network developer. In other words, current bridge solutions give rise to questions and issues of trust in cross-chain transactions, as at least one side in a cross-chain transaction may not have complete knowledge of the internal workings of the bridge. Currently, there is no universally trusted bridge for two or more blockchain networks with disparate network protocols or for environments where two states, with regulatory oversight on their respective blockchain networks, cannot trust each other. Therefore, the present disclosure provides technical solutions which include blockchain bridges that are co-built as a membrane of trust where participating blockchain networks may build and co-sign an offer-and-agreed-upon premise for mapping disparate blockchain protocols to a single equivalent that can be used as a platform to conduct cross-chain transactions.

Further, the blockchain bridge solutions disclosed herein may be used in a variety of blockchain network environments such as in permissioned network/permissioned network environments, permissionless network/permissionless network environments, and permissionless network/permissioned network environments.

One of skill in the art will appreciate that the blockchain bridge solutions disclosed herein fulfill two principles used to ensure correctness: established trust and attestable identities. The sufficiency of trust establishment may have criteria that should be met. For example, the criteria may include unfettered and independent checking of each side of the bridge. The criteria may further include mapping of independent checking of each side to a common equivalence (e.g., a processing equivalence, law of equivalence, etc.). The criteria may further include confirming the established non-mutable promise and equivalence on the network of each side of the bridge. The criteria may further include verifiability of the equivalence and the agreed context based on the equivalence a posteriori (e.g., non-reputability by either side after the equivalence is finalized).

Figure 13:
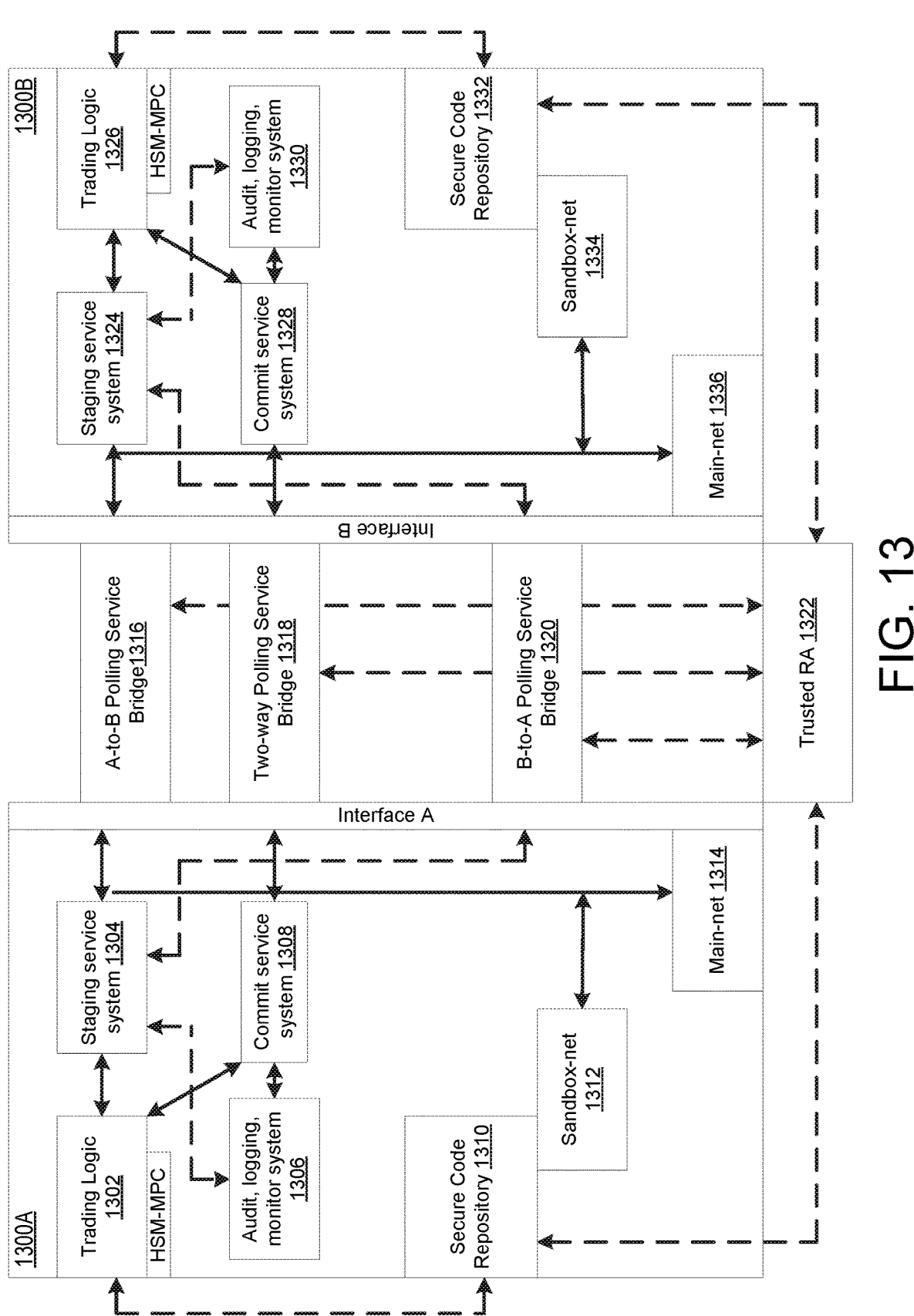
FIG. 13 illustrates an example of a two-way polling service bridge established between a first blockchain network and a second blockchain network.

FIG. 12 is a flow diagram showing steps of an example method 1200 for generating a blockchain bridge for heterogeneous blockchain networks for use in data exchange among the heterogenous blockchain networks. The steps of the method 1200 may be performed by any of the computing devices shown in FIG. 1. Alternatively or additionally, some or all of the steps of the method 1200 may be performed by one or more other computing devices. For explanatory purposes, steps of the method 1200 are primarily described in reference to FIGS. 13-15, but their description may generally be applied to other figures of the disclosure. Note that steps of the method 1200 may be modified, omitted, and/or performed in other orders, and/or other steps may be added.

At step 1202, a first blockchain network 1300A may send an event request to a second blockchain network 1300B. For example, the event request may be an initial proposition/offer to generate a two-way polling service bridge 1318 between the first blockchain network 1300A and second blockchain network 1300B to exchange data between the first blockchain network 1300A and the second blockchain network 1300B related to a type of event/transaction. For example, the event/transaction may include a transfer/exchange of cryptocurrency, tokens, smart contract instructions and/or other data between the blockchain networks.

The first blockchain network 1300A may use an A-to-B polling service bridge 1316, which may be a one-way communication system configured to send messages from the first blockchain network 1300A to the second blockchain network 1300B. For example, prior to sending the event request to the second blockchain network 1300B, the first blockchain network 1300A may generate/stage a message containing the event request using the staging service 1304. The first blockchain network 1300A may format the message, using trading logic 1203, into a format that is readable/understandable by the second blockchain network 1300B. For example, the trading logic 1203 may access secure code repository 1310 to determine the proper format (e.g., structure, syntax, parameters, encryption, etc.) for the second blockchain network 1300B to decrypt and understand the message. For example, the second blockchain network 1300B may be registered with the trusted registration authority 1322 (e.g., a public key infrastructure) so that other networks may be informed on how to send encrypted messages to the second blockchain network 1300B which can then be decrypted and read/understood by the second blockchain network 1300B. Thus, formatting the message may include using the correct syntax and/or parameters so that the second blockchain network 1300B may read/understand the message. In an implementation, the trusted registration authority 1322 may be a decentralized network where organizations may submit peer-reviewed and attested composite keys which are useable by other entities for communication with a registered organization. The secure code repository 1310 may store and periodically update the executable code corresponding to formatting messages to be sent to the second blockchain network 1300B. Once the event request has been formatted, the first blockchain network 1300A may send the event request to the second blockchain network 1300B via the A-to-B polling service bridge 1316.

At step 1204, the second blockchain network 1300B may receive the event request from the first blockchain network 1300A via the A-to-B polling service bridge 1316. For example, the second blockchain network 1300B may receive the event request at a staging service 1324 of the second blockchain network 1300B. The second blockchain network 1300B may decrypt and read the message containing the event request. The second blockchain network 1300B may acknowledge receipt of the event request by sending a message to the first blockchain network 1300A from the staging service 1324 through a B-to-A polling service bridge 1320. In some embodiments, the message may include an offer statement of equivalent processing of the event request for the second blockchain network 1300. For example, equivalent processing may mean that the processing of an event/transaction can be represented as different forms of expression on each blockchain network, but the blockchain networks have mutually agreed, through the processes described herein, that their respective forms of representing the event/transaction are equivalent. In some embodiments, a trading logic 1326 may format the message using code obtained from the secure code repository 1332, which may store a repository of code for formatting messages to be sent to the first blockchain network 1300A as informed by the first blockchain network's 1300A registration with the trusted registration authority 1322 as discussed above. For example, formatting the message may include encrypting the message using one or more public keys corresponding to the first blockchain network 1300A and registered with the trusted registration authority 1322. As another example, formatting the message may include using the correct syntax and/or parameters so that the first blockchain network 1300A is able to read/understand the message.

At step 1206, the first blockchain network 1300A may process the event request using a first protocol of the first blockchain network 1300A in response to receiving and decrypting the message from the second blockchain network 1300B. For example, the first blockchain network 1300A may process the event request by performing an encryption (e.g., authenticated encryption) of the event request to provide a first output. In some embodiments, the first blockchain network 1300A may perform authenticated encryption by using a cryptographic/cipher suite (e.g., one or more cryptographic hash functions). As one example, the first blockchain network 1300A may use a Galois/Counter Mode (GCM) for a cryptographic block cipher such as the Advanced Encryption Standard (AES) to perform the authenticated encryption of the event request (e.g., AES_GCM(event request x)). In some embodiments, the audit, logging, monitor system 1306 may monitor the processing of the event request using the first protocol for fraud detection and to verify the correctness of the first output.

In some embodiments, using the commit service system 1308, the first blockchain network 1300A may generate a signed binary with reference to the processing of the event request using the first protocol. For example, the first blockchain network 1300A may digitally sign executable code (compiled or non-compiled computer-readable code) that is used to process the event request on the first blockchain network 1300A. In some cases, the first blockchain network 1300A may digitally sign the executable code using a private key to provide a digital signature that is verifiable by using a corresponding public key that is registered with the trusted registration authority 1322.

At step 1208, the second blockchain network 1300B may process the event request using a second protocol of the second blockchain network 1300B. In some embodiments, the second protocol of the second blockchain network 1300B may be different than the first protocol of the first blockchain network 1300A. For example, the second blockchain network 1300B may process the event request by performing an encryption (e.g., authenticated encryption) of the event request to provide a second output. In some embodiments, the second blockchain network 1300B may perform an encryption by using a cryptographic/cipher suite, which may be different than the cryptographic/cipher suite used by the first blockchain network 1300A. As one example, the second blockchain network 1300B may use the SM4 cryptographic block cipher algorithm, which may be part of the second protocol of the second blockchain network 1300B, to perform the encryption of the event request (e.g., SM4 (event request x)). In some embodiments, the audit, logging, monitor system 1330 may monitor the processing of the event request using the second protocol for fraud detection and to verify the correctness of the second output.

In some embodiments, the second blockchain network 1300B may generate a signed binary with reference to the processing of the event request using the second protocol. For example, the second blockchain network 1300B may digitally sign executable code (compiled or non-compiled computer-readable code) used to process the event request on the second blockchain network 1300B. In some cases, the second blockchain network 1300B may digitally sign the executable code (e.g., generate a digital signature to attach to the executable code) using a private key, wherein the digital signature may be verifiable by using a corresponding public key that is registered with the trusted registration authority 1322.

The processing at steps 1206 and 1208 by the first blockchain network 1300A and the second blockchain networks 1300B may be referred to as a pre-work unilateral consensus where a premise for a processing equivalence between the blockchain networks 1300A and 1300B is established as a matter of fact on each side before each side may cross over to the other side to conduct redundancy computations on designated cluster nodes to attest to the consistency in the computations done by the other side using the binaries and references provided by the other side, as discussed below.

At step 1210, the first blockchain network 1300A may verify the processing performed by the second blockchain network 1300B. For example, the first blockchain network 1300A may verify the processing performed by the second blockchain network 1300B by processing the event request using the second protocol of the second blockchain network 1300B. An output computed by the first blockchain network 1300A by processing the event request using the second protocol may be compared against the second output provided by the second blockchain network 1300B at step 1208. If the outputs match, the first blockchain network 1300A may use such as evidence to confirm the consistency in the processing the event request using the second protocol as stated by the second blockchain network 1300B in the digitally signed binaries and references. In some embodiments, the first blockchain network 1300A may cross over to the second blockchain network's 1300B sandbox-net 1334, which may be designated cluster nodes of the second blockchain network 1300B available for the first blockchain network 1300A to perform the redundancy computations at step 1210, to verify the processing performed by the second blockchain network 1300B.

As an illustration, if the second blockchain network 1300B uses SM4 as a block cipher as part of the second protocol to process the event request, the first blockchain network 1300A may execute the executable code (including the SM4 block cipher), digitally signed by the second blockchain network 1300B, in the sandbox-net 1334 to verify that the processing by the second blockchain network 1300B that was performed at step 1208 is consistent. If the first blockchain network 1300A determines that the output of its redundancy checking is consistent with the output provided by the second blockchain network 1300B, the processing performed by the second blockchain network 1300B at step 1208 is verified by the first blockchain network 1300A.

At step 1212, the second blockchain network 1300B may verify the processing performed by the first blockchain network 1300A using the first protocol. For example, the second blockchain network 1300B may verify the processing performed by the first blockchain network 1300B by processing the event request using the first protocol of the first blockchain network 1300A to provide an output. The output determined by the second blockchain network 1300B may be compared against the first output provided by the first blockchain network 1300A at step 1206 to confirm that the outputs match. If the outputs match, the second blockchain network 1300B may use such as evidence to verify that the processing of the event request performed by the first blockchain network 1300A at step 1206 is consistent. In some embodiments, the second blockchain network 1300B may cross over to the first blockchain network's 1300B sandbox-net 1312, which may be designated cluster nodes of the first blockchain network 1300A that are available for the second blockchain network 1300B to perform the redundancy computations at step 1212 to verify the processing performed by the first blockchain network 1300A.

In some embodiments, the sandbox-net 1312 may be similar to a sidechain of the first blockchain network 1300A and is configured to execute the same or similar network protocols as the first blockchain network 1300A to process the event request. Likewise, in some embodiments, the sandbox-net 1334 may be similar to a sidechain of the second blockchain network 1300B and is configured to execute the same or similar network protocols as the second blockchain network 1300B to process the event request.

As an illustration, if the first blockchain network 1300A uses AES GCM as a block cipher as part of the first protocol to process the event request, the second blockchain network 1300B may execute the executable code (including the AES GCM block cipher), digitally signed by the first blockchain network 1300A, in the sandbox-net 1312 to verify that the processing performed by the first blockchain network 1300A at step 1206 is consistent. If the output computed by the second blockchain network 1300B in the sandbox-net 1312 matches the first output provided by the first blockchain network 1300A in processing the event request at block 1206, the second blockchain network 1300B may use such as evidence to verify the consistency of the processing performed by the first blockchain network 1300A.

At step 1214, the first blockchain network 1300A may perform operations to establish the processing equivalence of the event request on the first blockchain network 1300A. For example, the first blockchain network 1300A may digitally sign a bridge agreement using the commit service system 1308. By digitally signing the bridge agreement, the first blockchain network 1300A is finalizing its commitment to the processing equivalence stating that processing the event request using the first blockchain network's 1300A first protocol for recording the event request on the first blockchain network's 1300A main-net 1314 is equivalent to processing the event request using the second blockchain network's 1300B second protocol for recording the event request on the second blockchain network's 1300B main-net 1336 (e.g., AES_GCM(event request x)==SM4(event request x)).

In some embodiments, the main-net 1314 may be a live and running blockchain corresponding to the first blockchain network 1300A. Similarly, the main-net 1336 may be a live and running blockchain corresponding to the second blockchain network 1300B. For a permissionless blockchain network, or with permission on a permissioned blockchain network, a main-net may be inspected, for example by using a block explorer, to identify agreed processing equivalences that have been recorded on the blockchain of the blockchain network.

At step 1216, the second blockchain network 1300B may perform operations to establish processing equivalence of the event request on the second blockchain network 1300B. For example, the second blockchain network 1300B, using the commit service system 1328, may digitally sign the bridge agreement stating that processing the event request using the second blockchain network's 1300B second protocol for recording the event request on the second blockchain network's 1300B main-net B 1336 is equivalent to processing the event request using the first blockchain network's 1300A first protocol for recording the event request on the first blockchain network's 1300B main-net A 1314.

Once the bridge agreement for processing equivalence has been digitally signed by the first and second blockchain networks 1300A and 1300B, neither side can repudiate the processing equivalence of the event request on each blockchain network. The processing equivalence may then be used as a basis to establish the two-way polling service bridge 1318 between the first blockchain network 1300A and the second blockchain network 1300B. The two-way polling service bridge 1318 is therefore a blockchain bridge that is co-built by the first and second blockchain networks 1300A and 1300B and may be used to conduct cross-chain actions. Since the first blockchain network 1300A and second blockchain network 1300B have agreed to a processing equivalence, a transaction may now be represented on the disparate blockchains of the first blockchain network 1300A and the second blockchain network 1300B even though each blockchain network may process the transaction separately using different protocols.

In some embodiments, the first blockchain network 1300A and second blockchain network 1300B may broadcast the processing equivalence to their respective main-nets 1314 and 1336 so that the blockchains of nodes in their respective main-nets 1314 and 1336 are updated with a record of the agreed processing equivalence. For example, the processing equivalence may be included in a block in the blockchains of the main-nets 1314 and 1336. In some embodiments, each blockchain network 1300A and 1300B may use the two-way polling service bridge 1318 to query that the nodes of the other blockchain network have been updated with records of the agreed processing equivalence, and issue to each other an acknowledgement message indicating completion from both blockchain networks. For example, the first blockchain network 1300A may send a notice to the second blockchain network 1300B, via the two-way polling service bridge 1318, indicating an establishment of the processing equivalence on the blockchain of the first blockchain network 1300A. The first blockchain network 1300A may receive a notice, sent from the second blockchain network 1300B via the two-way polling service bridge 1318, indicating an establishment of the processing equivalence on a blockchain of the second blockchain network 1300B.

At block 1218, the first blockchain network 1300A and second blockchain network 1300B may conduct exchanges over the two-way polling service bridge 1318. In some embodiments, the two-way polling service bridge 1318 may be one of a plurality of two-way polling service bridges established between the first blockchain network 1300A and the second blockchain network 1300B. Each of the plurality of two-way polling service bridges may correspond to a specific type of event/transaction. Thus, each two-way polling service bridge may be contextual and configured to facilitate a specific cross-chain event/transaction, which may prevent communication collisions between the first blockchain network 1300A and second blockchain network 1300B. The plurality of two-way polling service bridges may therefore be considered a membrane of session bridges in some embodiments.

Figure 14:
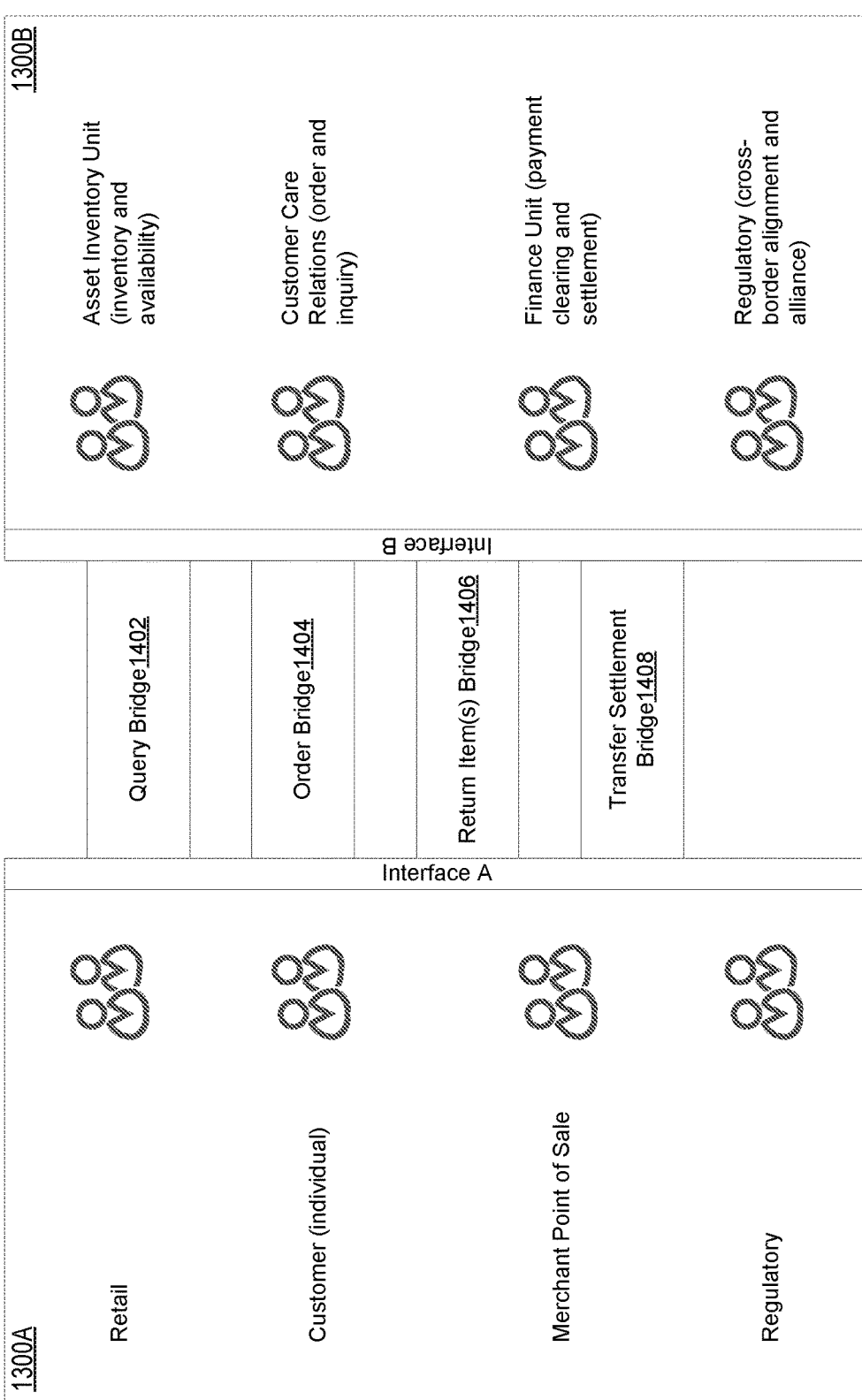
FIG. 14 illustrates examples of two-way polling service bridges established between blockchain networks.

For example, referring to FIG. 14, the first blockchain network 1300A and second blockchain network 1300B may establish bridges 1402-1408 using the method 1200. Participants in the first blockchain network 1300A, such as nodes corresponding to retail entities, individual customers, merchant point of sale devices, and regulatory entities may use the various bridges 1402-1408 to conduct cross-chain actions with the second blockchain network 1300B. The query bridge 1402 may be established for processing query events between the first blockchain network 1300A and the second blockchain network 1300B. The order bridge 1404 may be established for processing orders between the first blockchain network 1300A and the second blockchain network 1300B. The return item(s) bridge 1406 may be established for processing item return events between the first blockchain network 1300A and the second blockchain network 1300B. The transfer settlement bridge 1408 may be established for processing the settlement of transactions between the first blockchain network 1300A and the second blockchain network 1300B.

Figure 15:
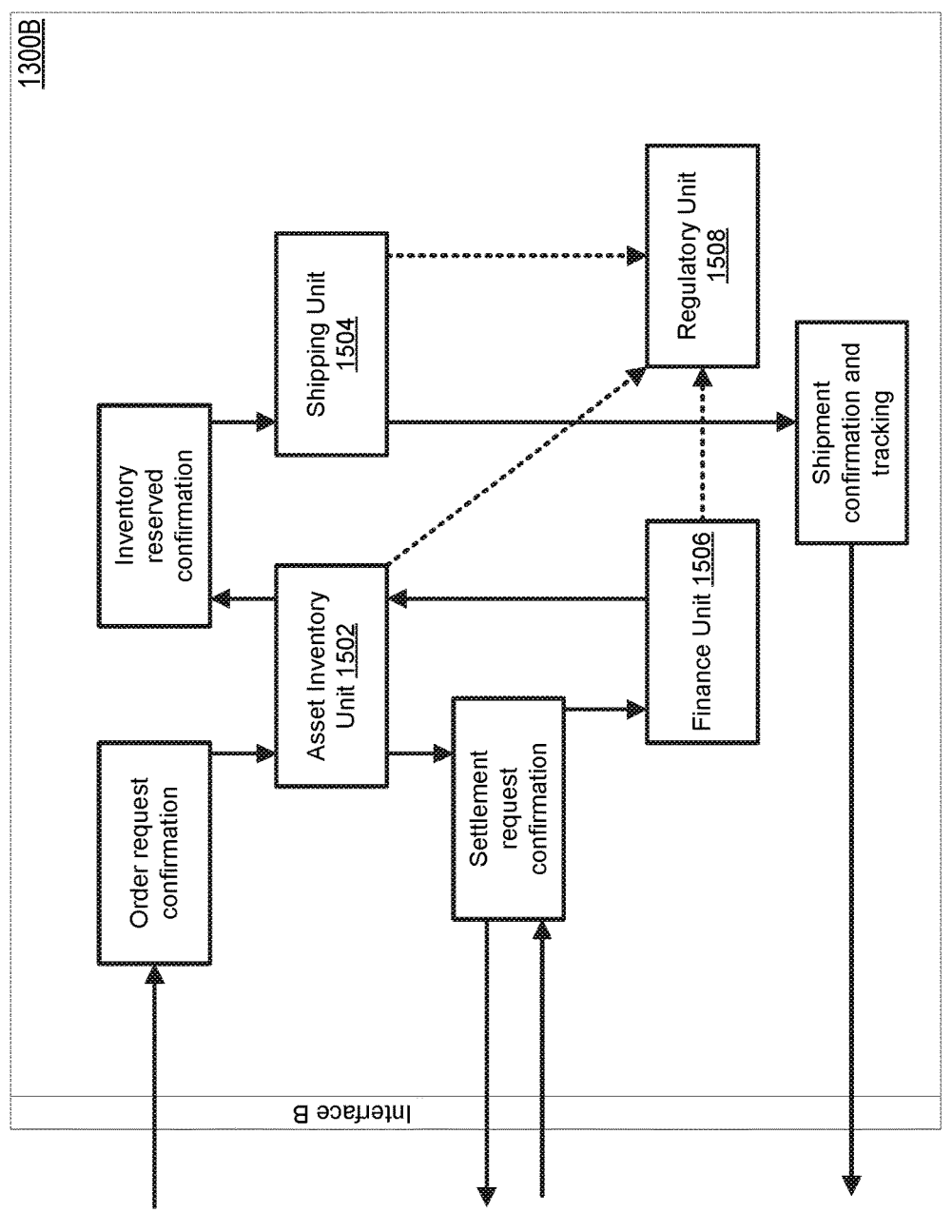
FIG. 15 illustrates example events that trigger atomic blockchains for microservices.

FIG. 15 illustrates an embodiment of the second blockchain network 1300B which includes an asset inventory unit 1502, shipping unit 1504, finance unit 1506, and regulatory unit 1508. In some embodiments, cross-chain events between the first blockchain network 1300A and the second blockchain network 1300B may trigger an atomic blockchain associated with the second blockchain network 1300B for specific microservices. For example, each unit 1502-1508 may be an atomic blockchain network capable of automatically recording events and providing event-related data to the other units. The different units 1502-1508 may interact with each other in their own blockchain network. The units 1502-1508 may be configured as interworking clusters (e.g., clusters of computers) that commit the stages in a transaction. For example, the finance unit 1506 may confirm and conduct imports/exports for large scale trade with conditions that certain payments are made or that the trade does not transgress trade sanctions or agreements stored by the regulatory unit 1508. As further examples, the asset inventory unit 1502 may confirm that an asset is readily available and the shipping unit 1504 may confirm that the asset is ready to be shipped. In some embodiments, the asset inventory unit 1502, shipping unit 1504, and finance unit 1506 may communicate with the regulatory unit 1508 to determine cross-border legality and alignment if an event is associated with a cross-border transaction, whether the event is a business-to-consumer transaction and/or business-to-business transaction.

The commitment of the clusters (or operating units 1502-1508) can be committed as evidence when the transaction is staging. If the stage of the transaction is communicated and committed as part of a promise, it will be logged as part of a unit's ledger, so that it cannot walk backwards or repudiate on the stage announced, especially when there is a commitment of timeliness. Therefore, the evidence of events can be part of co-building the two-way polling service bridge 1318 between the first blockchain network 1300A and second blockchain network 1300B (or multiple networks if the transaction has more than two parties). As both sides of a transaction can perform its own independent redundancy checking, each side may build confidence in the co-building of trust between networks, which may manifest in the membrane of bridges 1402-1408.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

The invention claimed is:

1. A system, comprising:
a non-transitory memory; and
one or more hardware processors coupled with the non-transitory memory and configured to read instructions from the non-transitory memory to cause the system to perform operations comprising:
    transmitting a transaction request from a first blockchain network to a second blockchain network, wherein the transaction request is associated with a transaction for exchanging a first digital item associated with the first blockchain network with a second digital item associated with the second blockchain network;
    processing, by a computer node associated with the first blockchain network, the transaction using a first protocol of the first blockchain network;
    processing, by the computer node, the transaction using a second protocol of the second blockchain network;
    verifying, by the computer node, an equivalent processing provided by the second blockchain network based on an output from the processing the transaction using the second protocol; and
    establishing a bridge between the first blockchain network and the second blockchain network based on the verifying.

2. The system of claim 1, wherein the second protocol is different from the first protocol.

3. The system of claim 1, wherein the operations further comprise:
providing, within the first blockchain network, a first sandbox environment that enables a second computer node of the second blockchain network to process the transaction using the first protocol.

4. The system of claim 3, wherein the processing the transaction using the second protocol is performed within a second sandbox environment associated with the second blockchain network.

5. The system of claim 1, wherein the first digital item comprises a first token in a first cryptocurrency associated with the first blockchain network, and wherein the second digital item comprises a second token in a second cryptocurrency associated with the second blockchain network.

6. The system of claim 1, wherein the operations further comprise:
digitally signing a bridge agreement between the first blockchain network and the second blockchain network using an encryption key associated with the first blockchain network; and
broadcasting the bridge agreement to a plurality of computer nodes within the first blockchain network.

7. The system of claim 1, wherein the operations further comprise:

conducting a cross-network transaction between the first blockchain network and the second blockchain network via the bridge.

8. A method, comprising:

receiving a first transaction request from a user device, wherein the first transaction request is associated with a first transaction that involves a first digital item associated with a first blockchain network with a second digital item associated with a second blockchain network; and processing, by a computer node associated with the first blockchain network, the first transaction via a bridge established between the first blockchain network and the second blockchain network, wherein the bridge is established based on verifying an equivalent processing provided by the second blockchain network using a first output generated by processing a second transaction using a first protocol associated with the first blockchain network and a second output generated by processing the second transaction using a second protocol associated with the second blockchain network.

9. The method of claim 8, wherein the processing the second transaction using the second protocol associated with the second blockchain network is performed within a sandbox environment within the second blockchain network.

10. The method of claim 8, wherein the bridge is one of a plurality of bridges established between the first blockchain network and the second blockchain network.

11. The method of claim 10, further comprising:

determining a transaction type associated with the first transaction; and selecting, from the plurality of bridges, the bridge for processing the first transaction based on the transaction type.

12. The method of claim 8, wherein the first digital item comprises a first token in a first cryptocurrency associated with the first blockchain network, and wherein the second digital item comprises a second token in a second cryptocurrency associated with the second blockchain network.

13. The method of claim 8, further comprising:

digitally signing a bridge agreement between the first blockchain network and the second blockchain network using an encryption key associated with the first blockchain network; and broadcasting the bridge agreement to a plurality of computer nodes associated with the first blockchain network.

14. The method of claim 8, wherein the bridge is a two-way polling service bridge.

15. A non-transitory machine-readable medium having stored thereon machine-readable instructions executable to cause a machine associated with a first blockchain network to perform operations comprising:

transmitting a transaction request from a first blockchain network to a second blockchain network, wherein the transaction request is associated with a transaction that involves a first digital item associated with the first blockchain network with a second digital item associated with the second blockchain network;

processing the transaction using a first protocol of the first blockchain network;

processing the transaction using a second protocol of the second blockchain network;

verifying an equivalent processing provided by the second blockchain network based on an output from the processing the transaction using the second protocol; and establishing a bridge between the first blockchain network and the second blockchain network based on the verifying.

16. The non-transitory machine-readable medium of claim 15, wherein the second protocol is different from the first protocol.

17. The non-transitory machine-readable medium of claim 15, wherein the operations further comprise:

providing, within the first blockchain network, a first sandbox environment that enables a computer node of the second blockchain network to process the transaction using the first protocol.

18. The non-transitory machine-readable medium of claim 17, wherein the processing the transaction using the second protocol is performed within a second sandbox environment associated with the second blockchain network.

19. The non-transitory machine-readable medium of claim 15, wherein the first digital item comprises a first token in a first cryptocurrency associated with the first blockchain network, and wherein the second digital item comprises a second token in a second cryptocurrency associated with the second blockchain network.

20. The non-transitory machine-readable medium of claim 15, wherein the operations further comprise:

conducting a cross-network transaction between the first blockchain network and the second blockchain network via the bridge.

* * * * *